(12) United States Patent
Cranfill et al.

(10) Patent No.: US 9,817,545 B2
(45) Date of Patent: Nov. 14, 2017

(54) IDENTIFICATION OF RECENTLY DOWNLOADED CONTENT

(71) Applicant: Apple Inc., Cupertino, CA (US)

(72) Inventors: Elizabeth C. Cranfill, San Francisco, CA (US); Scott Forstall, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/249,215

(22) Filed: Aug. 26, 2016

(65) Prior Publication Data

US 2017/0083209 A1 Mar. 23, 2017

Related U.S. Application Data

(63) Continuation of application No. 13/830,297, filed on Mar. 14, 2013, now Pat. No. 9,430,120.

(60) Provisional application No. 61/657,419, filed on Jun. 8, 2012.

(51) Int. Cl.
| | |
|---|---|
| *G06F 3/0482* | (2013.01) |
| *G06F 3/0481* | (2013.01) |
| *G06F 3/0488* | (2013.01) |
| *G06F 3/041* | (2006.01) |

(52) U.S. Cl.
CPC ........ *G06F 3/04817* (2013.01); *G06F 3/0482* (2013.01); *G06F 3/04886* (2013.01); *G06F 3/0416* (2013.01); *G06F 3/04883* (2013.01)

(58) Field of Classification Search
CPC . G06F 3/0482; G06F 3/04817; G06F 3/04886
See application file for complete search history.

(56) References Cited

U.S. PATENT DOCUMENTS

| | | |
|---|---|---|
| 2005/0120306 A1 | 6/2005 | Klassen et al. |
| 2007/0233782 A1 | 10/2007 | Tali |
| 2009/0058821 A1 | 3/2009 | Chaudhri et al. |
| (Continued) | | |

FOREIGN PATENT DOCUMENTS

EP    2 224 324 A1    9/2010

OTHER PUBLICATIONS

Office Action, dated Nov. 21, 2014, received in U.S. Appl. No. 13/830,297, 33 pages.

(Continued)

*Primary Examiner* — Andrey Belousov
*Assistant Examiner* — Seth A Silverman
(74) *Attorney, Agent, or Firm* — Morgan, Lewis & Bockius LLP

(57) ABSTRACT

Techniques for identifying recently installed applications on a portable electronic device facilitating locating newly installed applications on a mobile device are disclosed. A visual indicator may be displayed on an icon associated with an application that was recently installed on the portable electronic device. The visual indicator may be removed after a user has interacted with the application in some meaningful way. One or more applications are selected in an application store session for installation on a portable electronic device. After a selection of one or more applications, the application store session continues, and other applications may be selected, until an exit instruction is received. Upon the exit instruction, a home screen page containing at least one of the new applications is displayed.

18 Claims, 15 Drawing Sheets

(56) References Cited

U.S. PATENT DOCUMENTS

| | | |
|---|---|---|
| 2009/0064055 A1 | 3/2009 | Chaudhri et al. |
| 2009/0178008 A1 | 7/2009 | Herz et al. |
| 2009/0249247 A1 | 10/2009 | Tseng et al. |
| 2010/0107150 A1 | 4/2010 | Kamada et al. |
| 2010/0157989 A1 | 6/2010 | Krzyzanowski et al. |
| 2011/0055763 A1 | 3/2011 | Utsuki et al. |
| 2011/0099392 A1* | 4/2011 | Conway ............... G01C 21/265 713/300 |
| 2011/0177775 A1 | 7/2011 | Gupta et al. |
| 2011/0191770 A1 | 8/2011 | Inoue |
| 2012/0009903 A1 | 1/2012 | Schultz et al. |
| 2012/0047499 A1 | 2/2012 | Krzystofczyk et al. |
| 2012/0072871 A1* | 3/2012 | Seo ....................... H04N 5/445 715/838 |
| 2012/0204131 A1 | 8/2012 | Hoang et al. |
| 2012/0303476 A1 | 11/2012 | Krzyzanowski et al. |
| 2012/0317498 A1* | 12/2012 | Logan ................ G06F 3/04817 715/752 |

OTHER PUBLICATIONS

Final Office Action, dated Apr. 29, 2015, received in U.S. Appl. No. 13/830,297, 37 pages.

Office Action, dated Nov. 15, 2015, received in U.S. Appl. No. 13/830,297, 48 pages.

Notice of Allowance, dated May 2, 2016, received in U.S. Appl. No. 13/830,297, 13 pages.

* cited by examiner

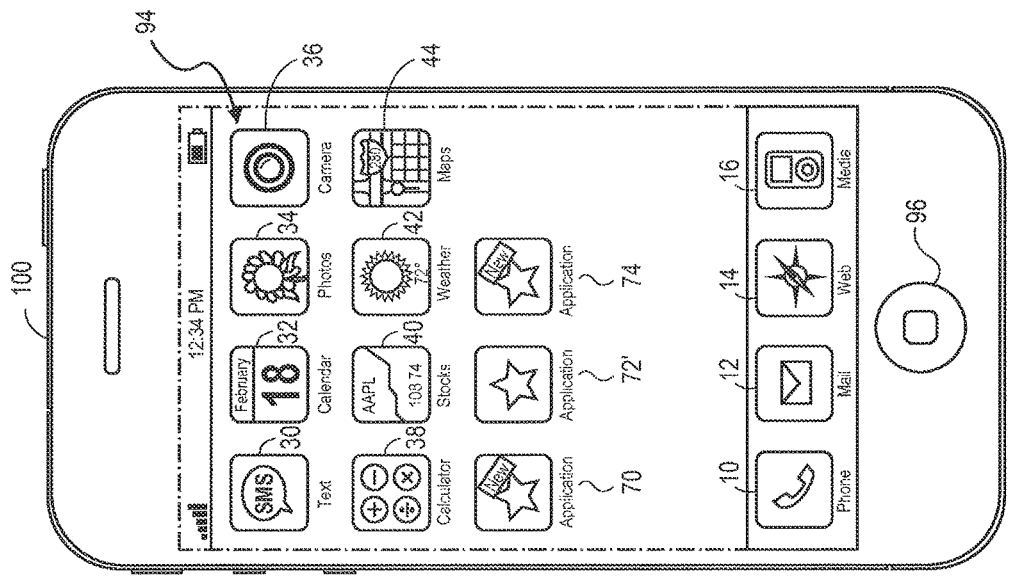
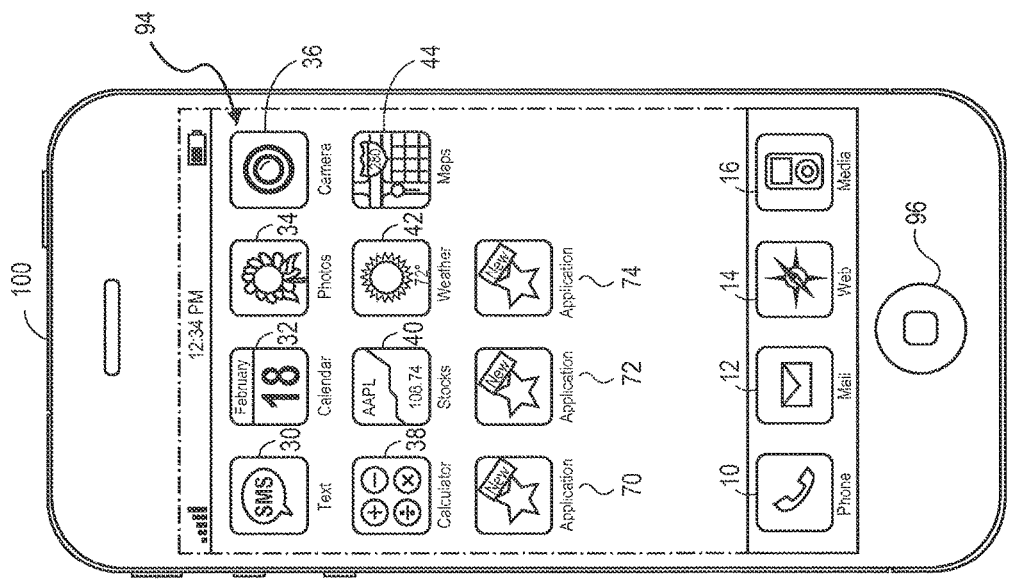

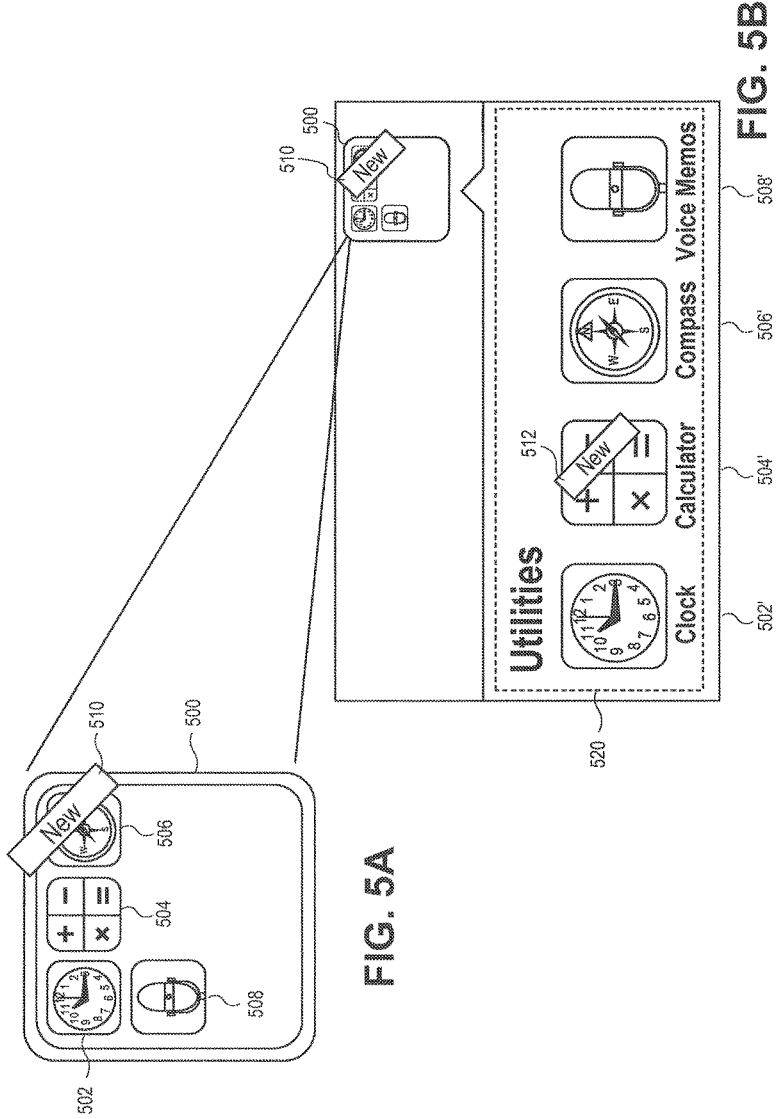

IDENTIFICATION OF RECENTLY DOWNLOADED CONTENT

RELATED APPLICATIONS

This application is a continuation of U.S. application Ser. No. 13/830,297, filed Mar. 14, 2013, which claims priority from and is a nonprovisional application of U.S. Provisional Application No. 61/657,419, titled "Identification Of Recently Installed Content," filed Jun. 8, 2012, which are hereby incorporated by reference in their entirety.

BACKGROUND

The present disclosure generally relates to identification of recently installed applications on a portable electronic device.

Applications, or apps, may be installed and executed on portable electronic devices. Icons corresponding to the installed applications may be displayed on a user interface of the portable electronic device—sometimes called a home screen, application menu, or springboard on iOS devices. An icon corresponding to an application generally displays some application-specific information so that the application corresponding to an icon is easily identifiable by the user. Selecting an icon corresponding to an application generally invokes execution of the application. The icons on the home screen thus act as launching pads for the corresponding applications.

A home screen may contain one or more pages of icons for one or more applications. There may be several home screen pages on a portable electronic device to display the various icons corresponding to applications installed on the device. As more and more applications are installed on a device, it becomes difficult for a user to find applications, especially recently installed applications. This problem is especially acute if the user installs several new applications and does not know where on the home screen the icons corresponding to the new applications are located.

Embodiments of the invention address this and other problems both individually and collectively.

BRIEF SUMMARY

Certain embodiments are described that enable locating recently installed applications on a portable electronic device.

In some embodiments, a visual indicator is displayed with an icon associated with an application that was recently installed on a portable electronic device. The visual indicator visually distinguishes the icon from other icons for other applications. This makes it easier for a user to locate and use a recently installed application. Examples of a visual indicator include a sash on the icon, a badge on the icon, a color of the icon, text, opacity of the icon, size of the icon, movement of the icon, or flashing of the icon.

In some embodiments, a user browses and installs applications using an application store application on a portable electronic device. After selecting a first application for installation, the device continues to display a user interface for the application store application, allowing the user to continue to browse additional applications and, potentially, select other applications for installation. Upon the next presentation of the home screen, the first home screen page containing an icon with a recently installed application can be shown. In another embodiment, upon the next presentation of the home screen, any home screen page containing an icon with a recently installed application can be shown (e.g., the last home screen page, the home screen page containing the most recently installed application, or the home screen page containing the first recently installed application).

Examples of the remove visual indicator event include, but are not limited to: when the installed application is launched, when the installed application is moved to a folder, and when the installed application is moved to a different location on one or more of the pages. The visual indicator may comprise one or more of the following: a sash on the first graphical object, a badge on the first graphical object, a color of the first graphical object, text, opacity of the first graphical object, size of the first graphical object, movement of the first graphical object (e.g., animation), or flashing of the first graphical object. In one embodiment, the first user interface is an application store application user interface. In one embodiment, the second user interface is an application menu user interface.

These and other embodiments will be described further below.

BRIEF DESCRIPTION OF THE DRAWINGS

FIGS. 4A-4B and 5A-5B depict exemplary user interfaces with visual indicators according to some embodiments.

DETAILED DESCRIPTION

Figure 1:
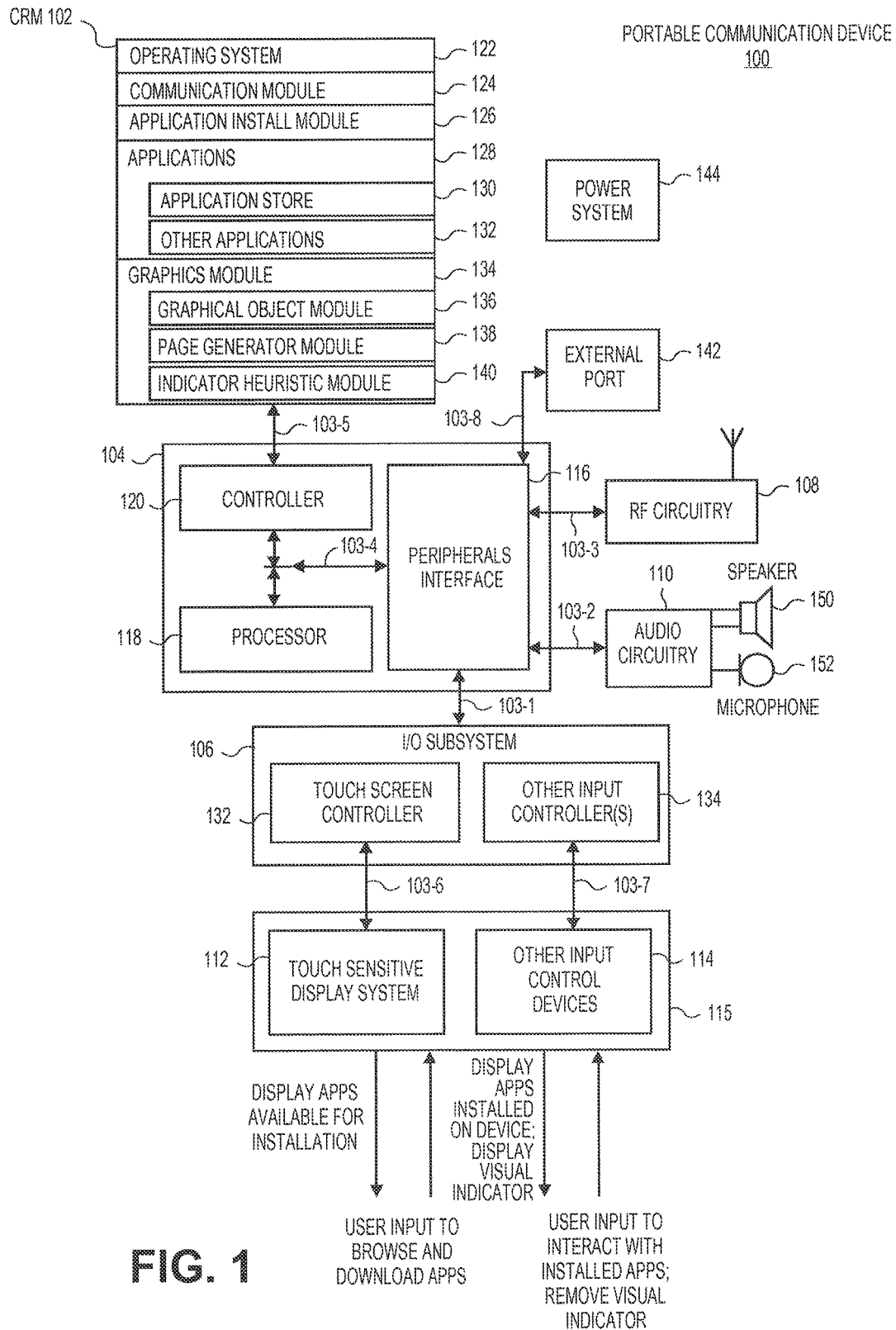
FIG. 1 depicts a simplified block diagram of a system according to some embodiments of the present invention.

In the following description, specific details are set forth in order to provide a thorough understanding of embodiments of the invention for the purposes of explanation. However, it will be apparent that various embodiments may be practiced without these specific details. In other instances, well-known methods, procedures, components, and circuits have not been described in detail so as not to unnecessarily obscure aspects of certain embodiments.

Certain embodiments of the present invention assist in identifying recently installed applications so recently installed applications can be easily located and launched by the user. This enhances the user experience by eliminating the frustration of "losing" applications and spending time searching home screen pages for newly installed applications. Some embodiments of the invention may also allow a user to stay in the application store and browse additional applications without immediately having to be shown the location of the recently installed application on the home screen. Again, this enhances the user experience by allowing the user to remain in the application store and browse and select additional applications for installation. By making it more convenient for the user to download applications, the number of applications downloaded may increase. In some cases, where the applications are paid applications, application developer revenue may increase as a result of certain embodiments of the present invention.

In one embodiment, a visual indicator may be displayed on an icon for an application after the application is installed on a portable electronic device. For example, if a home screen has ten application icons displayed on it and one of the applications was recently installed on the portable electronic device, a visual indicator may be displayed along with an icon for the application. The visual indicator may be a sash associated with an icon corresponding to a recently installed application. A "sash," as used herein, refers to a graphical object associated with an icon for an application that graphically resembles a physical sash (a clothing accessory worn over one shoulder or about the waist). For example, the graphical sash may appear to be draped diagonally across the icon for an application. In one embodiment, a user may download multiple applications from the application store, and each icon for the recently downloaded applications may be visually distinguished from other icons with a sash.

In some embodiments, the visual indicator associated with an icon corresponding to a recently installed application may be displayed until one or more specified events occur. In one embodiment, the sash may be removed after the user has interacted with the application in some way. Interactions that may trigger removal of the visual indicator include, but are not limited to, launching the application, moving it into a folder, or moving the icon for the application to another location on the home screen. In one embodiment, the sash may be removed after a predetermined time has passed since the application was installed (e.g., one week, one month, etc.).

In one embodiment, after a user installs one or more applications on a portable electronic device using an application store user interface, the display continues to show the application store user interface until an instruction to exit the application store is received. After receiving an instruction to exit the application store, the home screen page that has an icon for a recently installed application may be displayed regardless of whether the particular home screen page is the first application menu page in a sequence of pages or the main application menu page. For example, if the portable electronic device has three pages of applications, upon exiting the application store user interface, the portable electronic device may display a page with one or more icons for new applications on the page. In another embodiment, after the user leaves the application store user interface, the page of the home screen containing the new application icon(s) may be displayed to the user. In one embodiment, the icon for the new application may have a visual indicator associated with the icon.

Portable Electronic Device Architecture

FIG. 1 is a simplified block system diagram of one embodiment of portable electronic device. A portable electronic device 100 generally includes one or more computer-readable mediums (CRM) 102, a processing system 104, an input/output (I/O) subsystem 106, radio frequency (RF) circuitry 108 and audio circuitry 110. These components may be coupled by one or more communication buses or signal lines 103. The device 100 can be any portable electronic device, including but not limited to a handheld computer, a tablet computer, a mobile phone, a smart phone, a media player, a personal digital assistant (PDA), a camera, a game console, a navigation device, an email device, and the like, including a combination of two or more of these items. Specific examples of portable electronic devices include, but are not limited to, IPHONE®; IPAD®, IPOD®, IPOD TOUCH®, etc.

In the case of mobile devices with the operating system iOS (e.g., IPHONE®; IPAD®, IPOD®, IPOD TOUCH®), the one or more home screens may be managed by a "springboard." Springboard is an application that is configured to manage the home screen(s), launch and bootstrap applications, and manage certain device settings at startup. For example, in iOS devices, actuating the home button may display a page of the home screen with application icons for launching applications (e.g., a home screen or springboard with application icons). Springboard manages the one or more pages of applications for an application menu user interface (i.e., a user interface that displays and facilitates the use of the various applications on a portable electronic device). The specific home screen page may be the last visited home screen page; however, in other embodiments, it is possible to display another home screen page (e.g., the first home screen page in a sequence of pages, the main home screen page, the last home screen page in a sequence of pages, etc.).

It should be apparent that the architecture shown in FIG. 1 is only one example of an architecture for the portable electronic device 100, and that the device 100 could have more or fewer components than shown, or a different configuration of components. The various components shown in FIG. 1 can be implemented in hardware, software, or a combination of hardware and software, including one or more signal processing and/or application specific integrated circuits. The RF circuitry 108 is used to send and receive information over a wireless link or network to one or more other devices and includes well-known circuitry for performing this function, including but not limited to an antenna system, an RF transceiver, one or more amplifiers, a tuner, one or more oscillators, a digital signal processor, a CODEC chipset, memory, etc. In some embodiments, the RF circuitry 108 is capable of establishing and maintaining communications with other devices using one or more communications protocols, including but not limited to time division multiple access (TDMA), code division multiple access (CDMA), global system for mobile communications (GSM), Enhanced Data GSM Environment (EDGE), wideband code division multiple access (W-CDMA), WI-FI (such as IEEE 802.11a, IEEE 802.11b, IEEE 802.11g and/or IEEE 802.11n), BLUETOOTH, WI-MAX, voice over Internet Protocol (VoIP), a protocol for email, instant messaging, and/or a short message service (SMS), or any other suitable communication protocol, including communication protocols not yet developed as of the filing date of this document.

The RF circuitry 108 and the audio circuitry 110 are coupled to the processing system 104 via the peripherals interface 116. The interface 116 includes various known components for establishing and maintaining communication between peripherals and the processing system 104. In some embodiments, the peripherals interface 116, the one or more processors 118, and the memory controller 120 may be implemented on a single chip, while in other embodiments the components may be distributed across multiple chips. In some other embodiments, they may be implemented on separate chips. The audio circuitry 110 is coupled to an audio speaker 150 and a microphone 152 and includes known circuitry for processing voice signals received from interface 116 to enable a user to communicate in real-time with other users. In some embodiments, the audio circuitry 110 includes a headphone jack (not shown). Voice and data information received by the RF circuitry 108 and the audio circuitry 110 (e.g., in speech recognition or voice command applications) is sent to one or more processors 118 via the peripherals interface 116. The one or more processors 118 are configurable to process various data formats for one or more applications 128 stored on the medium 102.

Sensors, devices, and subsystems can be coupled to the peripherals interface 116 to facilitate multiple functionalities. For example, a motion sensor, a light sensor, and/or a proximity sensor may be coupled to the peripherals interface 116 to facilitate the orientation, lighting, and proximity functions. Other sensors can also be connected to the peripherals interface 116, such as a positioning system (e.g., GPS receiver), a temperature sensor, a biometric sensor, or other sensing device, to facilitate related functionalities.

The one or more applications 128 may include an application store application 130 or any suitable other suitable application 132. For example, other applications 132 could include any application available from an application store accessible using the application store application 130 or any application that is preinstalled on the portable electronic device 100 at the time of purchase, including without limitation, browser applications, address book applications, contact list applications, email applications, instant messaging applications, word processing applications, keyboard emulation applications, widgets applications, JAVA-enabled applications, encryption applications, digital rights management applications, voice recognition applications, voice replication applications, location determination capability applications (such as that provided by the global positioning system (GPS)), a music player applications (which plays back recorded music stored in one or more files, such as MP3 or AAC files), etc.

Note that the term "data" includes but is not limited to text, graphics, Web pages, JAVA applets, widgets, emails, instant messages, voice, digital images or video, widgets, MP3s, etc., which can be used by one or more applications programs 128 stored on the medium 102 (e.g., Web browser applications, email applications, etc.). In some embodiments, the device 100 is capable of uploading and downloading various data from the Internet over a wireless network or an external port 142, such as files, songs, digital images, videos, emails, widgets, instant messages and the like.

The peripherals interface 116 couples the input and output peripherals of the device to the processor 118 and the computer-readable medium 102. An example of a computer-readable medium 102 is a memory. The one or more processors 118 communicate with the one or more computer-readable mediums 102 via a controller 120. The computer-readable medium 102 can be any device or medium that can store code and/or data for use by the one or more processors 118. The medium 102 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs).

The one or more processors 118 run various software components stored in the medium 102 to perform various functions for the device 100. In some embodiments, the software components include an operating system 122, a communication module (or set of instructions) 124, an application install module (or set of instructions) 126, applications (or set of instructions) 128 that may include an application store 130 (or set of instructions) and other applications 132 (or set of instructions), and a graphics module (or set of instructions) 134. The graphics module 134 may comprise a graphical object module (or set of instructions) 136, a page generator module (or set of instructions) 138, and an indicator heuristic module (or set of instructions) 140. In other embodiments the graphics module may perform the functions of the graphical object module 136, the page generator module 138, and the indicator heuristic module 140; in other embodiments, other modules may perform similar functions.

The operating system 122 (e.g., Darwin, RTXC, LINUX, UNIX, OS X, iOS, WINDOWS, or an embedded operating system such as VxWorks) includes various procedures, sets of instructions, software components and/or drivers for controlling and managing general system tasks (e.g., memory management, storage device control, power management, etc.) and facilitates communication between various hardware and software components.

The communication module 124 facilitates communication with other devices over one or more external ports 142 or via RF circuitry 108 and includes various software components for handling data received from the RF circuitry 108 and/or the external port 142. The external port 142 (e.g., USB, FIREWIRE™, etc.) is adapted for coupling directly to other devices or indirectly over a network (e.g., the Internet, wireless LAN, etc.).

In some embodiments, the application install module 126 facilitates installation of an application. In one embodiment, the application install module 126 installs the application on the mobile device after the application was wirelessly downloaded. In one embodiment, the application install module 126 installs the application on the mobile device after a wired or wireless sync operation. The application install module 126 may be in operative communication with the graphics module 134 to generate an icon associated with an application, a page of application icons, and a visual indicator to display with the icon as appropriate.

The graphics module 134 includes various known software components for rendering, animating and displaying graphical objects on a display surface of a touch-sensitive display system 112. In one embodiment, graphics module 134 may include various subcomponents, such as a graphical object module 136, page generator module 138, indicator heuristic module 140, etc.

Figure 2A:
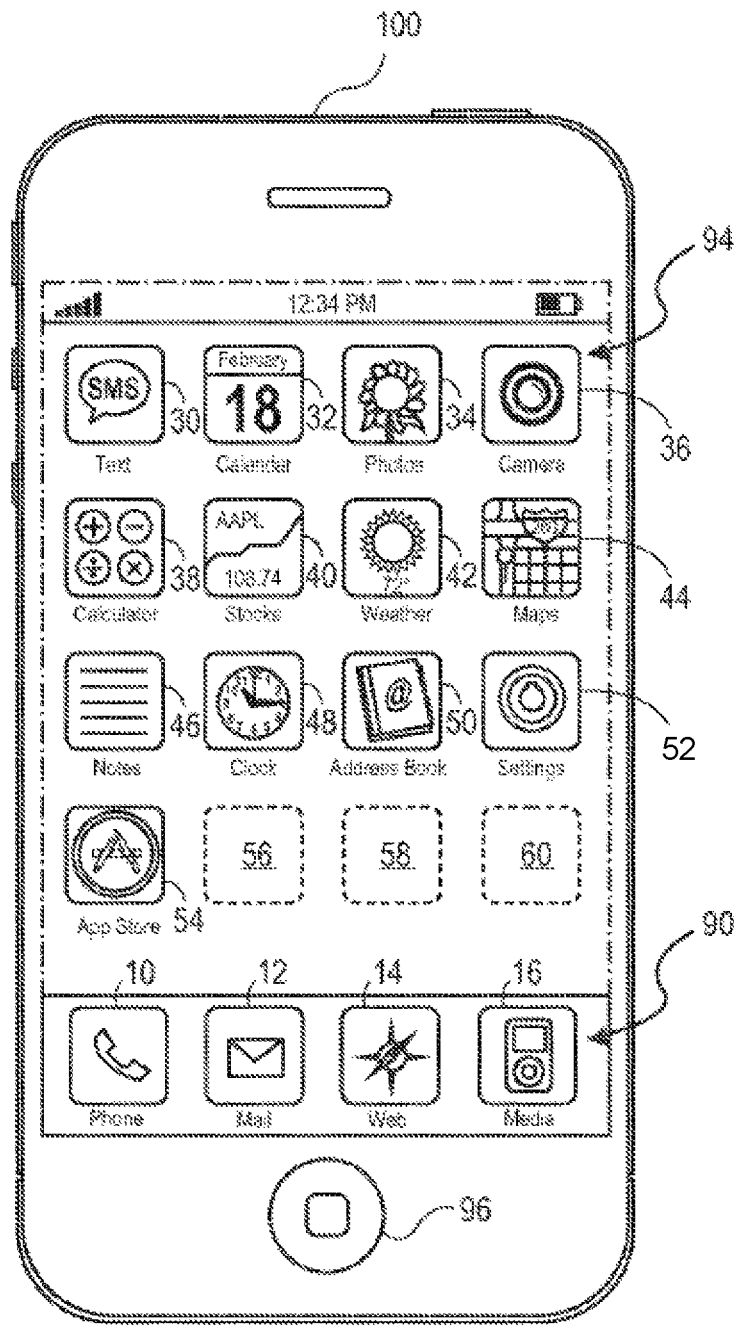
FIGS. 2A and 2B depict an exemplary page of an application menu user interface and an application store user interface, respectively, according to some embodiments of the invention.

Graphical object module 136 may generate graphical objects (e.g., icons) for the user interface. Note that the term "graphical object" includes any object that can be displayed to a user, including without limitation text, web pages, icons, digital images, animations and the like. Examples of icons include graphical objects 10, 12, 14, 16, 30, 32, 34, 36, 38, 40, 42, 44, 46, 48, 50, 52, 54, as shown in FIG. 2A, for example. The graphical object module 136 also may generate visual indicators, as shown in FIG. 4A, for example. The graphical object module 136 may receive an instruction to generate a visual indicator from the application install module 126 after a new application has been installed on the device 100. Similarly, the graphical object module 136 may receive an instruction to remove the visual indicator from the indicator heuristic module 140.

The page generator module 138 may generate the one or more pages of applications for the application menu user interface. The page generator module 138 may place icons corresponding to particular applications in a home screen icon position on a page of the home screen for the application menu user interface. Home screen icon positions may be predetermined and/or set by a user. For example, when a new application is installed on a device, the page generator module 138 may position an icon for the installed application in the first open position of the first page with an open position. For example, in FIG. 2A, open position 56 is available for placement of an icon for an application. In another embodiment, the page generator module may position an icon for the installed application in the last open position of the last page with an open position. In another embodiment, the page generator module may position the icon for the installed application in the first open position of the last page with an open position. In another embodiment, the page generator module may position the icon for the installed application in an open position chosen at random. In yet other embodiments, the page generator module may position the icon for the newly installed application in a position occupied by an application that is already installed, and the application that is already installed is evicted from this space and moved to another home screen icon position. In other embodiments, the page generator module may create a new page and place the icon for the installed application on the new page.

In one embodiment, the page generator module 138 may determine where an icon for a new application fits in with the user's personal arrangement of applications on their home screens. This auto-organization may occur by analyzing the user's current placement of icons for applications and other information. For example, the page generator module in conjunction with other modules may determine that a particular page of applications has one or more icons associated with transportation applications. When a new transportation application is installed on the device, the page generator may place an icon for the new transportation application on the page with other transportation applications. In one embodiment, the metadata associated with the application (e.g., such as the metadata used by the application store's categories/genres) could be used to place icons for like applications on the same page as similar applications. In some embodiments, a similar concept could be applied to folders. For example, if a user has a "shopping" folder, icons for new shopping apps could be added to that folder.

Auto-categorizing applications into folder or auto-organization on the home screen may be based on any suitable parameters. In one embodiment, the automatic application icon placement may be related to whether a user's pages are ordered by time and date of purchase/download/installation. For example, if the user's icons exhibit a high degree of chronological organization, an icon for a recently installed app may be positioned in chronological order (e.g., new apps would go to the first page in a sequence of home screens or the last page in a sequence of home screens). In one embodiment, the automatic application icon placement may be related to recency and/or frequency of app usage. In one embodiment, the automatic application icon placement may be related to the color of app icons (e.g., in the order of the rainbow or color spectrum, or in an ordering that avoids color clashing). In one embodiment, the automatic application icon placement may be related to the popularity of the new app (e.g., a highly rated app might reserve more prominent placement). In one embodiment, the automatic application icon placement may be related to the whether the applications require data or WI-FI or other device limitations. In one embodiment, the automatic application icon placement may be related to the whether the application has time-sensitive content. For example, time-sensitive content may be placed on the first page. In one embodiment, the automatic application icon placement may be related to the whether the application's content is based on the current location of the mobile device.

In one embodiment, the device may determine whether an application installed was an application that had never been installed on the mobile device or whether the application was previously installed on the device (e.g., reinstalled by the user after deleting the application). In one embodiment, the page location of the application from a previous installation may be referenced and upon reinstallation the device may restore the icon for that application to that previous location on the user interface.

The indicator heuristic module 140 may determine when a visual indicator displayed for an icon corresponding to an application is to be removed. As part of this processing, indicator heuristic module 140 may be configured to monitor various events related to the installed application. For example, indicator heuristic module 140 may monitor user inputs with respect to the application. In some embodiments, the following non-limiting list of events may qualify as events that signal the removal of the visual indicator: an event indicating that the installed application has been launched; an event indicating that the installed application is moved to a folder; an event indicating that the installed application is moved to a different location of the same page; an event indicating that the installed application is moved to a different page; an event indicating that a predetermined amount of time has passed since the application was installed; an event indicating that another application store session has been initiated and/or an event indicating that additional applications have been installed in other application store sessions; or any suitable combination thereof. Upon receipt or detection of a remove visual indicator event, the indicator heuristic module 140 may operate in conjunction with the graphical object module 136 and the page generator module 138 to remove the visual indicator from a particular graphical object.

The I/O subsystem 106 may be coupled to the touch-sensitive display system 112 and one or more other physical control devices 114 (e.g., pushbuttons, switches, dials, LEDs, etc.) for controlling or performing various functions, such as power control, speaker volume control, ring tone loudness, keyboard input, scrolling, hold, menu, screen lock, clearing and ending communications and the like. A user input subsystem may comprise the touch-sensitive display system 112 and the one or more other physical control devices 114. The touch-sensitive display 112 communicates with the processing system 104 via the touch sensitive screen controller 132, which includes various components for processing user input (e.g., scanning hardware). The one or more other input controllers 134 receive/send electrical signals from/to the other input or control devices 114. The other input/control devices 114 may include physical buttons (e.g., push buttons, rocker buttons, etc.), dials, slider switches, sticks, and so forth.

The touch-sensitive display 112 displays visual output to the user in a graphical user interface (GUI). The visual output may include text, graphics, video, and any combination thereof. The user may make contact with the touch-sensitive display 112 using any suitable object or appendage, such as a stylus, pen, finger, and so forth. Some or all of the visual output may correspond to user-interface objects. The touch-sensitive display 112 may also accept input from the user based on haptic and/or tactile contact. The touch-sensitive display 112 forms a touch-sensitive surface that accepts user input. The touch-sensitive display 112 and the touch screen controller 132 (along with any associated modules and/or sets of instructions in the medium 102)

detect contact (and any movement or release of the contact) on the touch-sensitive display 112 and convert the detected contact into interaction with user-interface objects, such as one or more soft keys, that are displayed on the touch screen when the contact occurs. In an exemplary embodiment, a point of contact between the touch-sensitive display 112 and the user corresponds to one or more digits of the user. The touch-sensitive display 112 may use LCD (liquid crystal display) technology, or LPD (light emitting polymer display) technology, although other display technologies may be used in other embodiments. The touch-sensitive display 112 and touch screen controller 132 may detect contact and any movement or release thereof using any of a plurality of touch sensitivity technologies, including but not limited to capacitive, resistive, infrared, and surface acoustic wave technologies, as well as other proximity sensor arrays or other elements for determining one or more points of contact with the touch-sensitive display 112.

In one embodiment, input/output components 115 may comprise the touch-sensitive display 112 and the one or more other physical control devices 114. In other embodiments, input/output component 115 may comprise displays other than a touch-sensitive display and other physical control devices. In some implementations, the touch-sensitive display 112 can comprise a multi-touch-sensitive display. A multi-touch-sensitive display can, for example, process multiple simultaneous touch points, including processing data related to the pressure, degree, and/or position of each touch point. Such processing facilitates gestures and interactions with multiple fingers, chording, and other interactions. As used herein, a gesture is a motion of the object/appendage making contact with the touch screen display surface. Other touch-sensitive display technologies can also be used, e.g., a display in which contact is made using a stylus or other pointing device.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch-sensitive display 112 or an extension of the touch-sensitive surface formed by the touch-sensitive display 112.

The device 100 also includes a power system 144 for powering the various hardware components. The power system 144 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in portable devices.

In one embodiment, the application store module 130, which may be in communication with an application store server, and the graphics module 134 generate an application store user interface with one or more applications available for installation. The application store user interface is displayed to a user on the I/O components 115 of the portable electronic device 100. Using the I/O components 115, the portable electronic device receives a user selection of an application to download. The user selection is provided to the I/O subsystem 106, peripherals interface 116, processor 118, and controller to the CRM 102 (and specifically, the application store application 130). The application store 130, in communication with an application store server, may initiate the download of the selected application. Thereafter, applications that are installed on the device by the application install module 126 and available for use may be displayed on an application menu user interface.

In one embodiment, a visual indicator may be generated by the graphical object module 136 and displayed on, near, or with an icon for the recently installed application indicating that the application is "new" on the device or recently installed. For example, if a home screen has ten applications displayed on it and one of the applications was recently installed on the portable electronic device, a visual indicator may be displayed along with an icon for the application. In one embodiment, for each application installed on the device, the graphics module generates an icon with a visual indicator for each icon associated with an application that was recently installed and generates an icon without a visual indicator for each icon associated with an application that was not recently installed. The visual indicator may be displayed until the occurrence of a remove visual indicator event is detected by the indicator heuristic module 140.

In one embodiment, when an application menu is shown for the first time after an application store session where at least one new application was downloaded, the page generator module 138 generates a home screen page that contains at least one recently installed application and that page may be displayed on the display 112. For example, if the portable electronic device has three pages of applications, upon exiting the application store user interface, the page generator module 138 may generate three pages of applications and the display 112 may display one of the pages with one or more new applications on the page. When applications are installed, the page generator may determine the placement of the new application icons on a page and/or determine what page of applications to place the new application where there is more than one page of applications.

Now that a portable electronic device according to some embodiments has been described, user interfaces that may be displayed on such portable electronics devices are described.

User Interface

FIG. 2A is an illustration of one embodiment of a portable electronic device 100. The portable electronic device 100 includes a display with a graphical user interface (GUI). A portable electronic device displays icons in one or more regions of a user interface of a display.

The user may interact with the portable electronic device 100 by making contact with the display surface using a stylus, a finger, or more than one finger. For example, the user may make contact with the display surface at a position of one of the icons (direct contact), thereby activating the function or application program corresponding to that icon. In some embodiments, the icon is activated when the user makes contact at the position of the icon and then breaks contact (for example, a tapping gesture). In some embodiments, the contact with the display surface used to activate the icon may not be at the position of the icon. Instead, contact may be proximate to the icon (indirect contact).

In some embodiments, the user interface is divided into multiple sections or windows. For example, a region of user interface may include a tray 90 for holding icons or graphical objects representing functions that are frequently used by the user (e.g., phone, mail, browser, music, etc.) and a tray 94 for holding icons or graphical objects representing functions that are used less frequently by the user (e.g., text, calendar photos, camera, etc.). Tray 94 may have open positions (56, 58, 60), which are shown as boxes with dotted lines for illustration purposes. Open positions 56, 58, and 60 are available for placement of a graphical object for an application.

In FIG. 2A, the GUI page has sixteen positions available for icons comprising a four position by four position grid in the tray 94. In the embodiment illustrated, thirteen of the graphical object positions are filled with graphical objects corresponding to applications (30, 32, 34, 36, 38, 40, 42, 44, 46, 48, 50, 52, 54), and three graphical object positions are open (56, 58, 60). Tray 90 has four graphical object positions, each of which is filled with a graphical object (10, 12, 14, and 16). Although the graphical object positions are shown as a fixed grid of a specific size with predefined available positions, one having skill in the art will realize that the arrangement of the plurality of graphical object positions could include any suitable size, shape, and position.

In one embodiment, when all positions are occupied by graphical objects, an additional graphical object may be added by evicting one of the current graphical objects. For example, an icon nearest to the additional icon or an icon that at least partially overlaps the additional icon may be evicted or removed from the tray 90. In another embodiment, the graphical objects may be resized to make room for the additional icon.

The GUI may also include graphical objects corresponding to high-level functions of the portable electronic device 100. In some implementations, the portable electronic device 100 can implement multiple device functionalities, such as a telephony device, as indicated by a phone object 10; an e-mail device, as indicated by the e-mail object 12; a network data communication device, as indicated by the Web object 14; a WI-FI base station device (not shown); and a media processing device, as indicated by the media player object 16. In some implementations, particular display objects, e.g., the phone object 10, the e-mail object 12, the Web object 14, and the media player object 16, can be displayed in a menu bar. In some implementations, device functionalities can be accessed from an application menu graphical user interface, such as the user interface illustrated in FIG. 2A. Touching one of the objects 10, 12, 14, or 16 can, for example, invoke corresponding functionality.

The application menu user interface may include additional display objects, such as a short messaging service (SMS) object 30, a calendar object 32, a photos object 34, a camera object 36, a calculator object 38, a stocks object 40, a weather object 42, a maps object 44, a notes object 46, a clock object 48, an address book object 50, and a settings object 52. Touching the SMS display object 30 can, for example, invoke an SMS messaging environment and supporting functionality; likewise, each selection of a display object 32, 34, 36, 38, 40, 42, 44, 46, 48, 50, and 52 can invoke a corresponding object environment and functionality.

In some implementations, upon invocation of device functionality, the graphical user interface of the portable electronic device 100 changes, or is augmented or replaced with another user interface or user interface elements (e.g., icon images), to facilitate user access to particular functions associated with the corresponding device functionality. For example, in response to a user touching the phone object 10, the graphical user interface of the touch-sensitive display 112 (FIG. 1) may present display objects related to various phone functions; likewise, touching of the email object 12 may cause the graphical user interface to present display objects related to various e-mail functions; touching the Web object 14 may cause the graphical user interface to present display objects related to various Web-surfing functions; and touching the media player object 16 may cause the graphical user interface to present display objects related to various media processing functions.

In response to a user selecting the application store object 54, the graphical user interface of the display 112 (FIG. 1) may display a user interface related to an application store (i.e., an application store user interface). For example, a user interface similar to FIG. 2B may be displayed. The displayed user interface may facilitate user access to particular functions associated with the application store functionality, such as browsing and downloading applications for the portable electronic device.

In some implementations, the application menu graphical user interface environment or state of FIG. 2A can be restored by pressing a button 96 located near the bottom of the portable electronic device 100. In some implementations, each corresponding device functionality may have corresponding "home" or "menu" display objects displayed on the touch-sensitive display, and the graphical user interface environment of FIG. 2A can be restored by pressing the "home" or "menu" display object.

In some implementations, graphical objects are placed inside a folder graphical object (see FIGS. 5A-B, below). The folder graphical object may comprise resized graphical objects corresponding to applications contained in the folder.

Gestures may be performed on the touch-sensitive display. In some implementations, the gesture includes a touch, tap, or dragging motion across the touch-sensitive display (e.g., using a finger, stylus, etc.). The gesture, in some implementations, is performed within a region where no user interface elements are displayed. For example, the user can perform a horizontal or vertical swipe across a blank region of the touch-sensitive display of the mobile device. In another example, the user can touch or tap a blank section of the display (e.g., to the top, bottom, left, or right of the blank region). In some implementations, a navigational guide may be displayed to the user. The user can, for example, touch or swipe a region of the navigational guide.

In response to a gesture, a second page of user interface elements may be presented. In some implementations, the second page of user interface elements is a second portion of the application menu. In some implementations, the user is provided with an indication that a second page of user interface elements is available for display. For example, when the first page of user interface elements is displayed, a portion of one or more of the second pages of user interface elements can be visible (e.g., a section of a display object at the edge of the display).

Any number of pages of user interface elements can be available for navigation. In some implementations, the user can be presented with a looping display of pages of user interface elements. For example, upon detection of a first horizontal left-to-right swipe, the first page of user interface elements is replaced with the second page of user interface elements within the touch-sensitive display. Upon detection of a second horizontal left-to-right swipe by the user, the first page of user interface elements can be displayed to the user again. In some other implementations, the user may be presented with no change in information upon the second left-to-right swipe, but a right-to-left swipe can return the user to the first page of user interface elements. In some implementations, once a gesture has been received by the touch-sensitive display, the pages of user interface elements continue to scroll until a stop indication has been received by the user or until reaching the end of the pages of user interface elements. For example, the user can touch the display using a stop gesture (e.g., tap or press), select a user interface element, press a button on the mobile device, etc.

In some implementations, icons can be displayed in multiple "pages" and the user can navigate between the pages, as described in U.S. patent application Ser. No. 11/850,005, for "Application Menu User Interface," filed Sep. 4, 2007, Publication No. US 2009/0064055, which is hereby incorporated by reference in its entirety. In such implementations, the user can drag an icon from a first page of icons to a second page of icons, and the user can swipe from a first page of icons to a second page of icons.

In some implementations, a user can specify an exchange of positions of icons in the user interface, as described in U.S. patent application Ser. No. 11/849,938, for "Editing Interface," filed Sep. 4, 2007, Publication No. US 2009/0058821, which is incorporated by reference herein in its entirety. In such implementations, the user can drag an icon from a first graphical object position to a second graphical object position. In other implementations, the user can drag an icon from a first page of icons to a second page of icons.

In some implementations, a reconfiguration mode may be initiated to vary the positions of one or more icons in a plurality of icons about their respective average positions, as described in U.S. patent application Ser. No. 12/242,851, for "Portable Multifunction Device With Interface Reconfiguration Mode," filed Sep. 4, 2007, Publication No. US 2009/0178008, which is incorporated by reference herein in its entirety. In such implementations, the user can drag an icon from a first graphical object position to a second graphical object position.

Figure 2B:
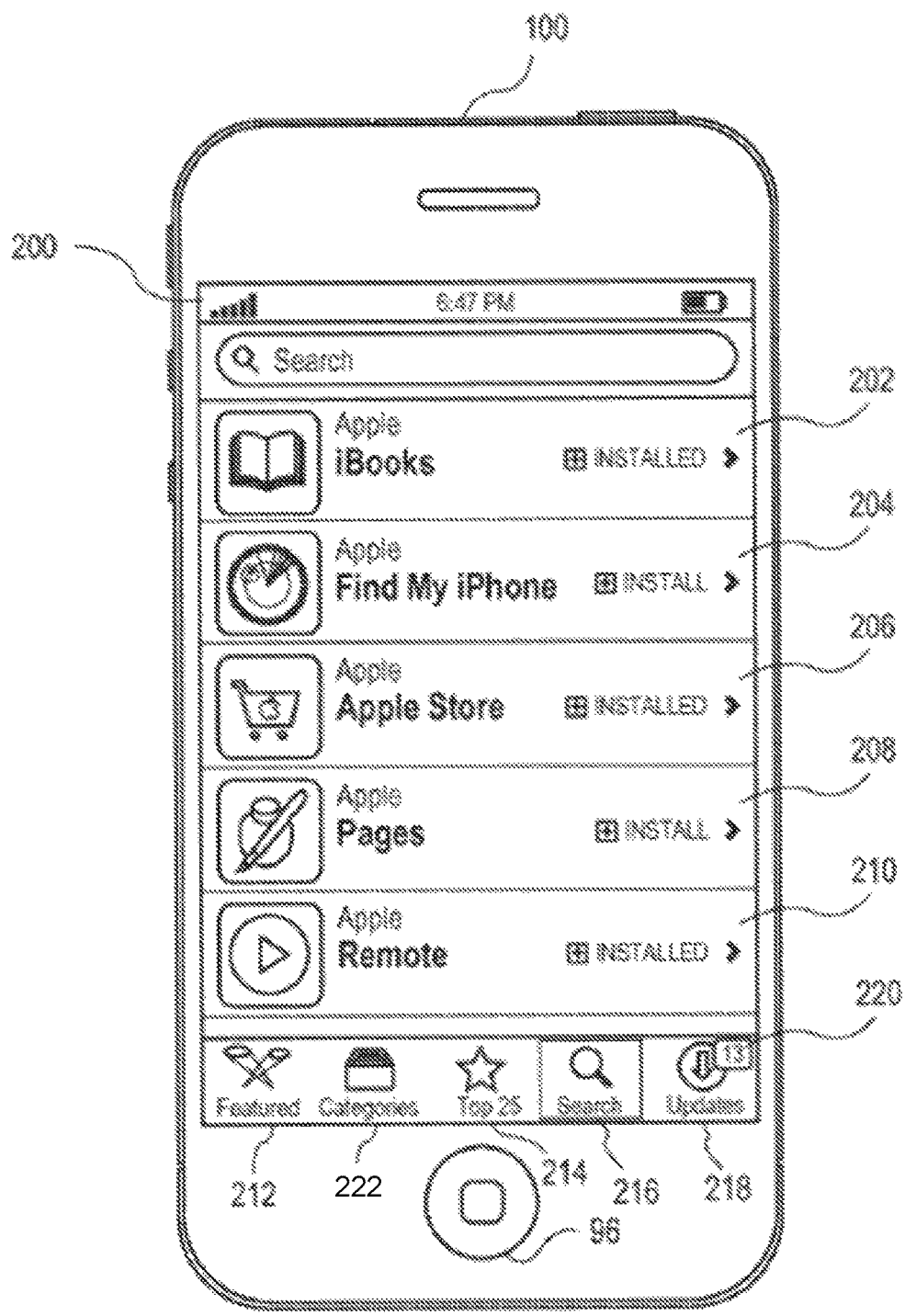

FIG. 2B shows an exemplary user interface 200 for an application store. This is an example of a graphical user interface of the portable electronic device 100 when it is changed, augmented or replaced with another user interface or user interface elements (e.g., icon images), to facilitate user access to particular functions associated with the corresponding device functionality. The application store user interface facilitates the browsing and downloading of applications for the portable electronic device 100. Applications may be paid applications (monetary value or account credits) or free applications. Arrangement of payment may be made using the application store user interface.

In the embodiment illustrated, there is a plurality of graphical objects associated with applications available from the application store (202, 204, 206, 208, and 210). For each application, the graphical object may comprise an icon for the application, graphical and/or textual rating information, an application name, a developer name, a status indicator (e.g., available to "install" or already "installed"), a price, etc. For example, the graphical object for IBOOKS® 202 includes an icon, the application name IBOOKS, the developer name APPLE, rating information, and an indication that it is already installed on the device 100. In another example, the graphical object for Find My iPhone includes an icon, the application name Find My iPhone, the developer name APPLE, rating information, and an indication that it is not installed on the device 100.

Figure 7A:
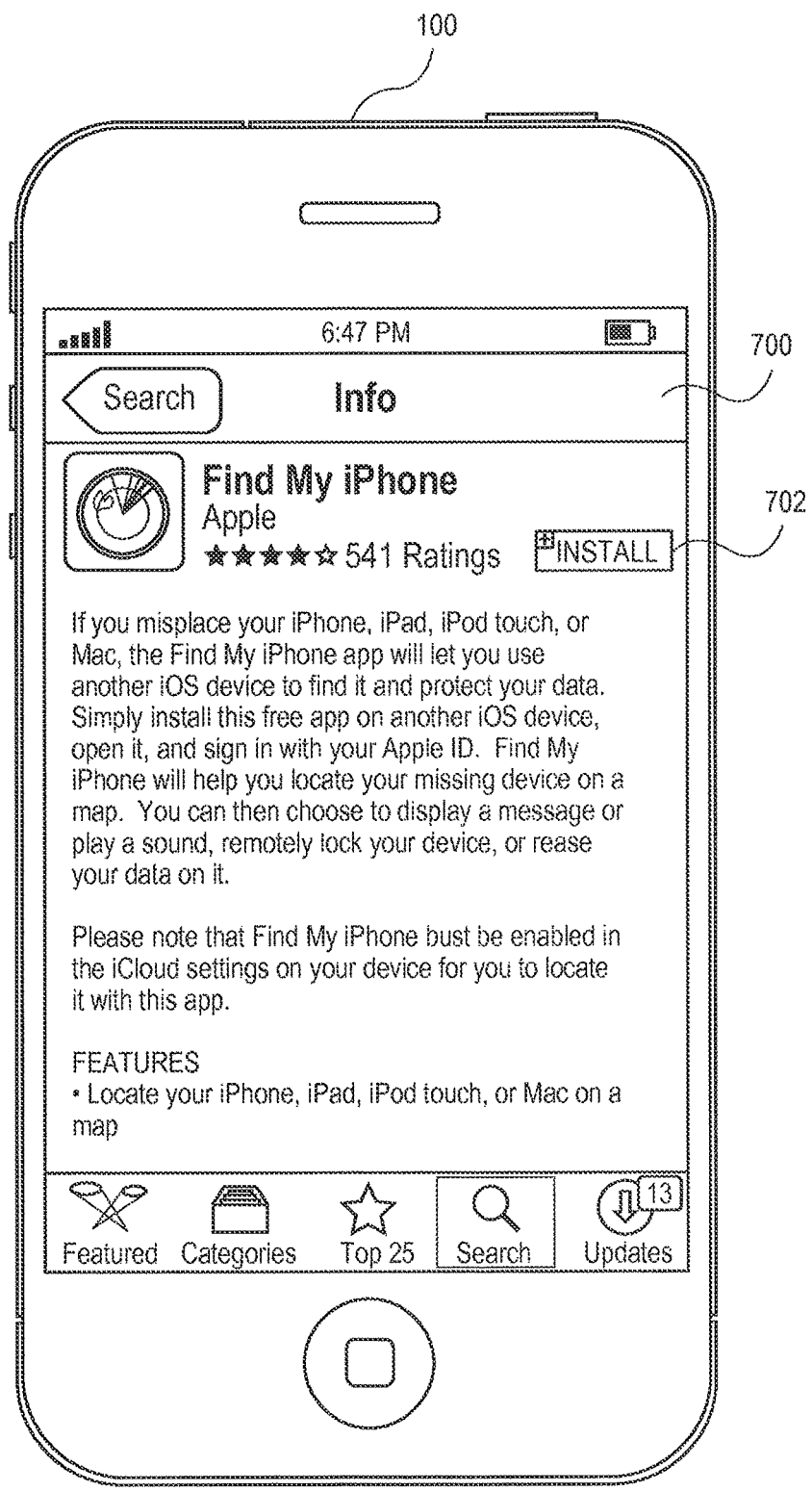
FIGS. 7A-7C and 8A-8C depict exemplary interfaces according to some embodiments.

Performing a gesture on the plurality of graphical objects associated with applications available from the application store may present a changed, augmented, or another user interface with further information on the particular application. For example, if "Find My iPhone" 204 is selected, a third user interface may be presented. An example of a third user interface is shown in FIG. 7A and is described in more detail below.

The user interface 200 for an application store may comprise graphical objects corresponding to various menus within the application store. For example, "Featured" graphical object 212 corresponds to applications that may be featured in the application store; "Categories" graphical object 222 corresponds to a menu where applications are grouped by categories, "Top" graphical object 214 corresponds to applications that are highly rated or the most downloaded; "Search" graphical object 216 corresponds to a search user interface menu; and "Updates" graphical object 218 corresponds to a menu for software updates for applications. Graphical objects may be associated with a badge. The badge may comprise text, such as a number. For example, the "Updates" graphical object 218 has a badge 220. Performing a gesture on the graphical objects 212, 214, 222, 216, 218 may present a changed, augmented, or another user interface with further information.

After the user is done browsing and/or downloading applications in the application store, the display may continue display an application menu user interface (i.e., the application store session may continue until a user affirmatively exits from the application store user interface). Actuating a "home button" or "menu button" may initiate an exit application store instruction. For example, selection of the home button 96 (as shown in FIG. 2B) can present the user with an initial display screen including the first page of user interface elements (e.g., as shown in FIG. 2A).

One having skill in the art will recognize that there are many other possible ways to initiate an exit instruction from the application store, including an exit gesture, a multitasking bar or gesture, or a notification center or gesture. In one embodiment, the exit instruction may indirectly exit the application store in the case of a multitasking application switch or a notification center application switch. For example, the application store user interface may be exited, and a home screen page displayed, by the user switching between the application store app and another app and then returning to the home screen (e.g., by actuating a home or menu button). In another example, the application store user interface may be exited, and a home screen displayed, by the user launching another application from a notification or alert and then returning to the home screen (e.g., by actuating a home or menu button). Other exit sequences are possible without departing from the scope of the present invention.

Visual Indicator Embodiment

Figure 3:
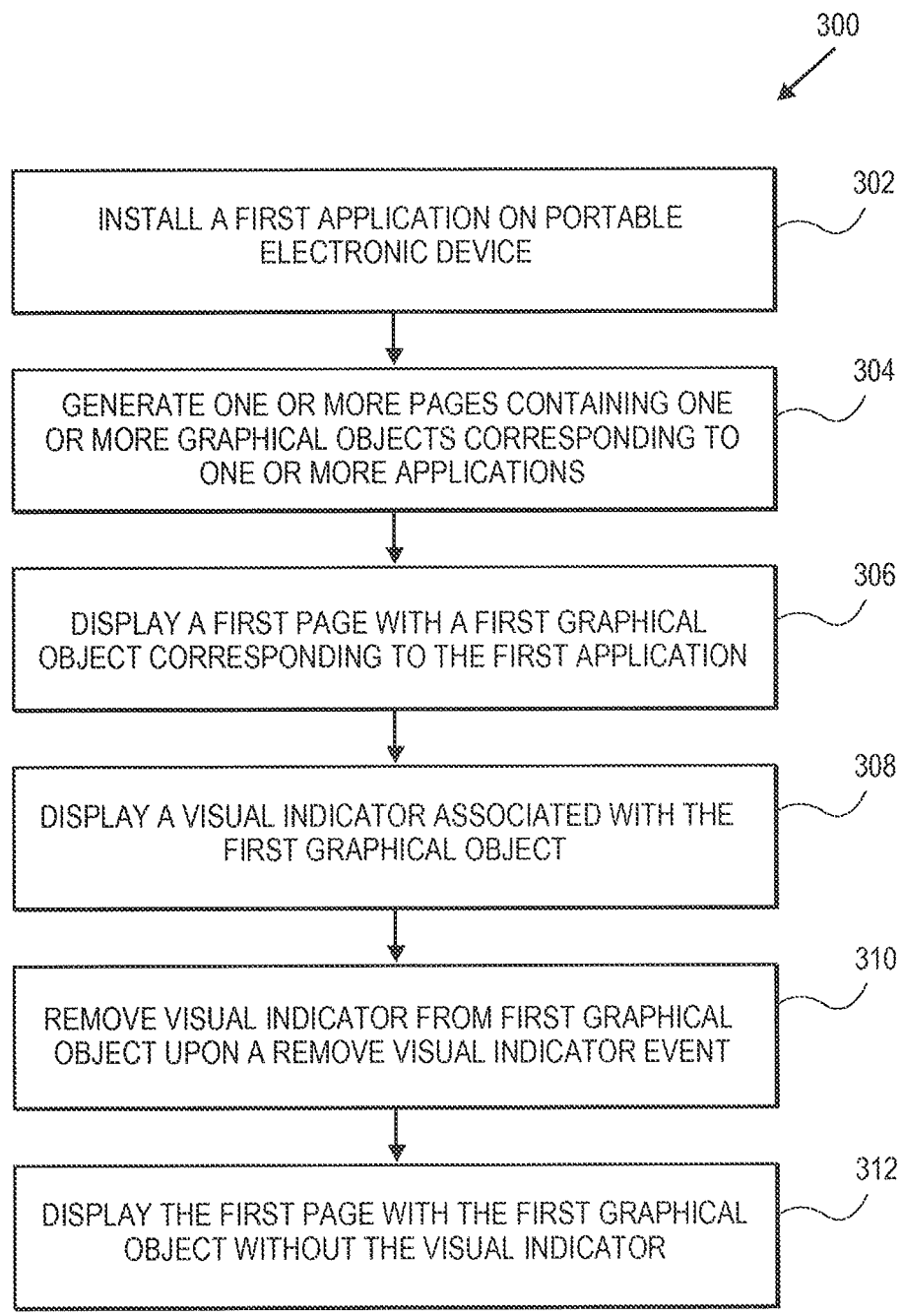
FIG. 3 depicts a simplified flowchart of a method for displaying and removing a visual indicator according to some embodiments.

FIG. 3 illustrates one embodiment of a process 300 of displaying a visual indicator. In one embodiment, a visual indicator may be displayed on, near, or with a graphical object for an application. For example, if a page has ten applications displayed on it and one of the applications was recently installed on the portable electronic device, a visual indicator may be displayed along with an icon for the application to visually distinguish the recently installed application from the other applications.

At step 302, a first application is installed on a portable electronic device 100. The installation of an application can occur in a number of ways. In one embodiment, the application is selected from an application store using a user interface on the portable electronic device. The application may be downloaded to the device from an application store server over cellular data or WiFi using RF circuitry 108 (FIG. 1). After the application is downloaded, it is installed directly on the portable electronic device. In one embodiment, the application is selected from an application store using a user interface on a personal computer. The application is downloaded to the personal computer and installed on the portable electronic device using a wired or wireless sync operation.

Installation of an application is the process of making the application ready for execution on the portable electronic device, including generating an icon associated with the application on the home screen or springboard. Installation of an application may be facilitated by an installer program, which is responsible for doing what is needed for the installation of the application. Installation of an application may occur using the applications install module 126 and application store application 130. Installation occurs after an application has been downloaded using the portable electronic device or a personal computer. In one embodiment, when an application is being downloaded to a mobile device an indication of the downloading is displayed on a user interface, and when the application is being installed an indication of the installation is displayed on a user interface (see, e.g., 710 and 714 in FIG. 7).

At step 304, the graphical object module 136 and/or the page generator module 138 may generate one or more pages containing one or more graphical objects corresponding to one or more applications. For example, the graphics module 134 may generate user interfaces similar to that illustrated in FIGS. 2A, 4A-B, and 8A-C, or another suitable user interface page.

At step 306, a first page of user interface elements is presented on the touch-sensitive display of a portable electronic device 100. In some other implementations, a user interaction can trigger presentation of the page of user interface elements. For example, selection of the home button 96 (as shown in FIGS. 2A-B) can present the user with an initial display screen including the first page of user interface elements. The user interface elements, for example, can include the display objects. In some implementations, the first page of user interface elements is a first portion of an application menu.

At step 308, a visual indicator associated with the first graphical object may be displayed. The visual indicator may visually distinguish the first graphical object from other graphical objects. For example, since the first graphical object was recently installed, it may have a visual characteristic that visually distinguishes it from other graphical objects or otherwise prominently displays from other graphical objects.

The visual indication may comprise a modified graphical object. Some examples of modifying the second icon include but are not limited to: modifying the color, opacity, or saturation of the graphical object; scaling the graphical object up or down in size; animating the graphical object (e.g., flashing, blinking, glowing, bouncing, vibrating, etc.); modifying the shape of the graphical object; adding text to the graphical object; or otherwise modifying the visual appearance of the graphical object. In one embodiment, the visual indicator may comprise a sash on the graphical object. In one embodiment, the visual indicator may comprise a badge on the graphical object. The graphical object module 136 (FIG. 1) may modify a standard graphical object corresponding to an application to add a visual indicator.

Displaying a visual indicator with an application icon on the application menu user interface is beneficial because it allows the user to easily visually distinguish the new application from other applications that are not new or not recently installed. This allows the user to find recently installed applications, which may be located among many other applications and distributed across more than one home screen page. This capability enhances the user experience and makes devices easier to use.

Visual indicators have been used to indicate new content within a single application. For example, the Newsstand and IBOOKS applications on mobile devices commercially available from APPLE display books or magazine issues within the respective user interfaces of the Newsstand and IBOOKS applications. The Newsstand and IBOOKS applications indicate when new content items (books and periodicals) are available from within the Newsstand or IBOOKS applications. Electronic books and periodical publications may be downloaded to mobile devices. However, books and periodical publications, unlike applications, are not installed on mobile devices. Identifying newly downloaded content (e.g., books and periodicals) that is available within a specific application is related to a problem different from locating the position of an icon associated with a recently installed application on an application menu user interface of a mobile device. Currently, new content in the Newsstand and IBOOKS applications is downloaded to the same location—inside the Newsstand and IBOOKS applications. Graphical objects for recently installed applications can be placed at any suitable location on the application menu user interface for a portable electronic device. Some embodiments of the present invention facilitate locating and using a new application, when the user may not necessarily know where on the home screen the icon for the new application is located.

At step 310, the graphical object module 136 (FIG. 1) may remove the visual indicator from the first graphical object upon a remove visual indicator event. That is, the graphical object module 136 (FIG. 1) generates a new graphical object without including the visual indicator upon a remove visual indicator event. The indicator heuristic module 140 (FIG. 1) may monitor user input for the remove visual indicator event.

The remove visual indicator event may be one or more of the following: when the installed application is launched; when the installed application is moved to a folder; when the installed application is moved to a different location the page; when the installed application is moved to a different page; when a predetermined amount of time has passed (e.g., the visual indicator is displayed only for 1 hour, 1 day, 1 week, 1 month, etc.) since the application was installed; when another application store session has been initiated (e.g., the next time the user opens the application store application) and/or additional applications have been selected in subsequent application store sessions (e.g., the next time the user selects applications for installation).

One having skill in the art will understand that other user interfaces may be presented between steps 308 and 310. A non-exclusive list of examples of user interfaces that could be presented between steps 308 and 310, include: a second page containing one or more graphical objects corresponding to one or more applications; a notification center for displaying notifications or alerts associated with applications; a multitask bar for switching between applications and/or resuming the use of another application; a search tool screen, such as SPOTLIGHT®; or a device lock screen. For example, a visual indicator associated with the first graphical object may be displayed on a first page, as per step 308. Then, a second page of graphical objects could be displayed (for example, by swiping the touch-sensitive display to the left or right), or another application could be launched invoking a user interface for that application. Upon return to the first page, the visual indicator may still be displayed if a remove visual indicator event did not occur.

At step 312, the display 112 may display the first graphical object without the visual indicator. In one embodiment, the display 112 receives instructions from the graphics module 134 (FIG. 1). An example of a graphical object without the visual indicator after a remove visual indicator event will be described in more detail below.

FIGS. 4A and 4B show an exemplary mobile device with an exemplary user interface with certain graphical objects having visual indicators. The application menu graphical user interface may include additional display objects, such as a short messaging service (SMS) object 30, a calendar object 32, a photos object 34, a camera object 36, a calculator object 38, a stocks object 40, a weather object 42, and a maps object 44. Again, touching the calendar display object 32 can, for example, invoke a calendar environment and supporting functionality; likewise, each selection of a display object 32, 34, 36, 38, 40, 42, and 44 can invoke a corresponding object environment and functionality.

FIG. 4A is an example of a user interface 94 that may be displayed after steps 306 and 308 in FIG. 3. The application menu graphical user interface may include additional display objects corresponding to a first recently installed application 70, a second recently installed application 72, and a third recently installed application 74. The recently installed applications may have a visual indication that visually distinguishes recently installed applications from applications that are not recently installed. An exemplary visual indicator 75 is shown as a "new" sash. One having skill in the art will recognize that other visual indicators could be used.

FIG. 4B is an example of a user interface 94 that may be displayed after steps 310 and 312 in FIG. 3. The user interface 94 in FIG. 4B is similar to the user interface 94 in FIG. 4A; however, one difference is that that the "new" sash (i.e., the visual indicator) has been removed from application 72'. The visual indicator may be removed after a remove visual indicator event (step 310) in FIG. 3. This may be accomplished using the graphics module 134 and indicator heuristic module 140 in FIG. 1. In the example shown, visual indictors remain on applications 70 and 74 because a remove visual indicator event has not occurred.

In one embodiment, the visual indicator may be a "new" sash associated with a new application or a recently installed application. In one embodiment, the visual indicator may be removed after the user has interacted with the application in some meaningful way, e.g., launching the application, moving it into a folder, moving it to another location on the home screen. In other embodiments, the sash may be associated with the folder if the application has not been launched.

An application may be considered recently installed after the application is installed on a portable electronic device and before a remove visual indicator event. In one embodiment, an application may be considered "new" or "recently installed" when the application is an application that has not been interacted with by the user. In one embodiment, an application may be considered "new" or "recently installed" when the application was downloaded for installation in the most recent application store session (i.e., the last time the user was in the application store). In one embodiment, an application may be considered "new" or "recently installed" until a predetermined amount of time has passed (e.g., 1 hour, 1 day, 1 month, etc.). In one embodiment, an application may be considered "new" or "recently installed" until a user installs additional applications. In one embodiment, an application may be considered "new" or "recently installed" until a sync operation is performed with a personal computer.

In one embodiment, the graphical object module may determine whether an application installed was an application that had never been installed on the mobile device or whether the application was previously installed on the device (e.g., reinstalled by the user after deleting the application). In one embodiment, an icon for an application that was reinstalled may not receive a visual indicator or may receive a less prominent visual indicator.

FIGS. 5A and 5B show an embodiment where an icon for a recently installed application is contained within a folder before a remove visual indicator event (such as in step 310 in FIG. 3). As described above, in some embodiments, placing an icon in a folder constitutes a remove indicator event. However, in other embodiments, placing an icon in a folder does not constitute a remove indicator event, and the visual indicator remains associated with the graphical object until a remove indicator event occurs. In one embodiment, the icon for the application and the icon for the folder may each have a visual indicator associated with it. For example, some embodiments, the sash may be associated with the folder and the icon for an application if the application contained in the folder has not been launched.

Shown in FIG. 5A is an enlarged view of a folder graphical object 500 representing a container for containing other graphical objects (502, 504, 506, and 508) associated with other applications. In the embodiment shown, icons for clock application 502, calculator application 504, compass application 506, and voice memos application 508 are contained within the folder icon 500. As previously discussed with respect to FIG. 1, the graphics module 134 and its components may be responsible for generating the graphical objects for the applications and folders. The folder 500 may have a visual indicator 510 indicating that the folder contains an application that was recently installed. User selection of the folder 500 may expand the folder to display the contents of the folder.

FIG. 5B shows an embodiment of the folder 500 after the folder has been expanded in response to a user command. Folder 500 has a visual indicator 510 indicating that the folder contains an application that was recently installed. The expanded applications area 520 contains icons for clock application 502', calculator application 504', compass application 506', and voice memos application 508'. Again, as described above, user selection of any of the icons 502', 504', 506', or 508' may launch a corresponding application. At the point in time illustrated in FIG. 5B, no remove indicator event has occurred, so the visual indicator 512 is still associated with the calculator icon 504'. Upon the occurrence of a remove indicator event, visual indicator 512 may be removed by the graphics module.

In one embodiment, icons for recently downloaded apps may be located within a predefined folder in a user interface (e.g., inside an icon associated with the a "new apps" folder). In some embodiments, after an application is installed on a portable electronic device, the icon for the application may be automatically placed in a folder. Graphically, the icon for the application may appear as part of the icon for the folder, and when the folder is selected the user interface may show an expanded view of the contents of the folder. The icon for the new applications folder may have a visual indicator associated with it, and the visual indicator may be removed upon the occurrence of a remove indicator event, as described herein. In one embodiment, a visual indicator associated with a folder icon is related to the number of visual indicators associated with applications that are inside of the folder. In one embodiment, the visual indicator associated with a folder icon is a badge, badge with a number, a sash, a sash with a number, or any combination thereof.

Applications for portable electronic devices may have updates that are periodically released by software developers to update features or otherwise improve the application. Software updates maybe be installed in ways similar to the initial installation of an application. In some embodiments, a software update may update/replace the existing application. In some embodiments, a software update may modify parts of the existing application rather than replace the existing application entirely. In one embodiment, a software update visual indicator associated with an icon for an application may indicate that a software update is available for the application. In one embodiment, software updated visual indicator associated with an icon for an application may indicate that a software update for the application has been installed. The software updated visual indicator associated with an icon for an application may visually distinguish the icon from icons for other apps that do not have an available update and/or are not recently installed.

Home Screen Page Jump Embodiment

Figure 6:
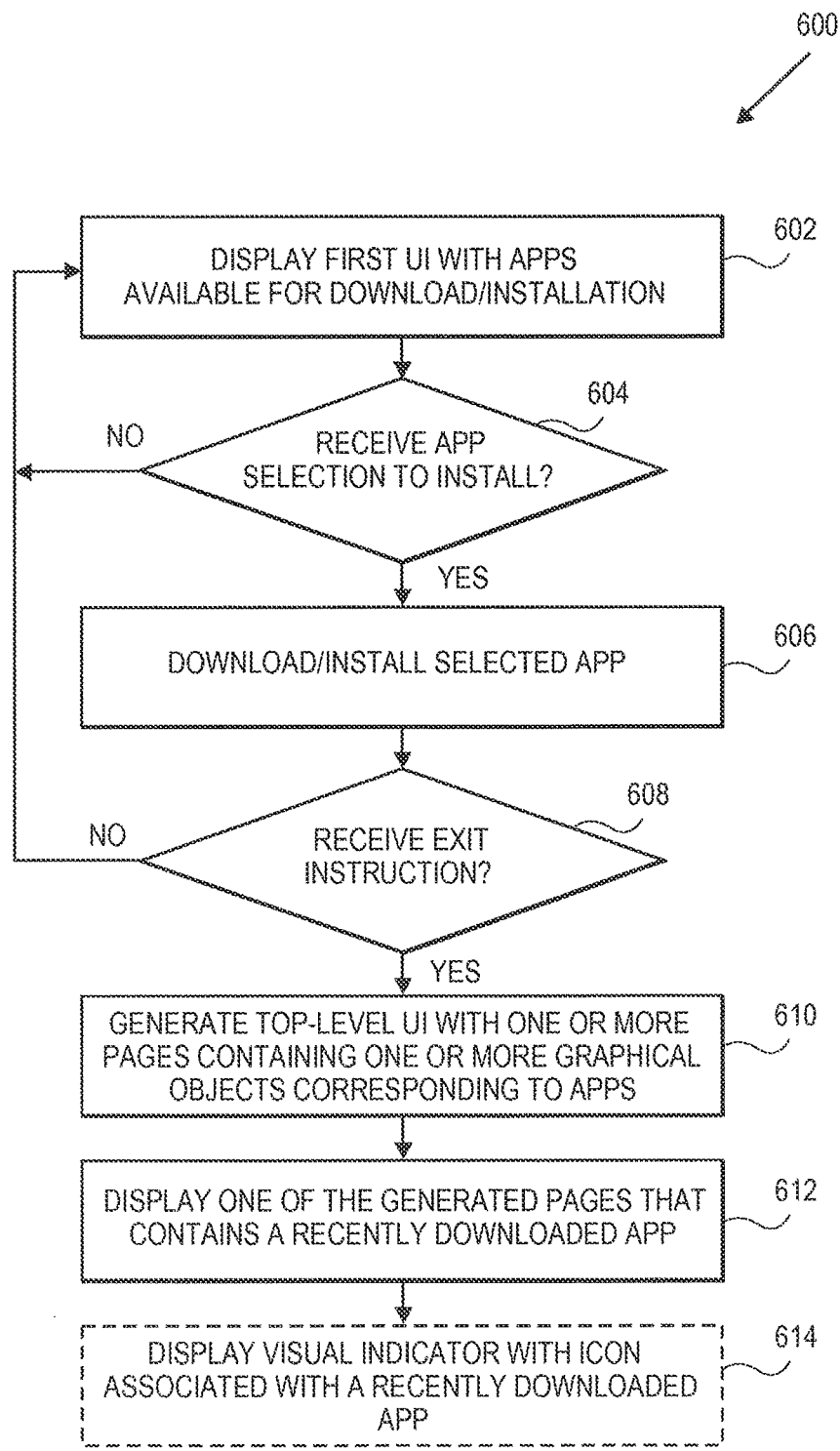
FIG. 6 depicts a simplified flowchart of a method for displaying a page with a recently installed application.

FIG. 6 shows method 600, an embodiment of the present invention that assists the user in locating recently installed applications upon exiting an application store interface (or upon the first presentation of the application menu user interface after exiting the application store). At step 602, a first user interface (i.e., an application store user interface) is displayed with application available for download/installation on the device. The user interface 200 in FIG. 2B is an example of an application store user interface that may correspond to the first user interface. There may be multiple levels of the first user interface (i.e., application store user interface). For example, upon a user selection of the icon for Find My iPhone 204, a second level to the application store user interface may be displayed (such as FIG. 7A). There also may be multiple first levels of the application store user interface; for example, graphical objects 212, 214, 222, 216, 218 may correspond to different "tabs" of the first level of the application store user interface.

At step 604, the portable electronic device processor determines whether a selection of an application to be downloaded from a user has been received. The install icon 702 (FIG. 7A) is an exemplary user input that may indicate a selection of an application to be downloaded. If a selection of an application to be downloaded has not been received from a user, the process returns to step 602 and the device continues to display the first user interface with applications available for installation. Although not shown, an exit instruction, such as described with respect to step 608 below, may be received from the user at any time (even before an application is selected for download), and that instruction may cause the display to show an application menu user interface, as described herein.

If a selection of an application to be downloaded has been received from a user, the process moves to step 606. At step 606, the application may be downloaded to the device over a cellular network, a WiFi network, or other wireless network. The downloaded application may be unpackaged, prepared for installation, and installed onto the portable electronic device. After step 606, the device continues to display the application store user interface, allowing the user to continue to browse applications.

At step 608, the processor determines whether an exit instruction has been received. An exit instruction is initiated when a user inputs an exit instruction to the application store user interface. One example of an exit instruction is pressing the home button 96. If an exit instruction is not received, the device continues to display the first user interface with applications available for installation (step 602). There may be multiple levels of the first user interface (i.e., application store user interface). If an exit instruction is received, the process moves to step 610. In one embodiment, the display continues to display a user interface for the application store. This permits the user to stay in the application store and purchase or download more applications. However, a disadvantage to staying in the application is that the user may not know where on the home screen the new application icons were placed. For example, if the user downloaded three applications, those applications may be placed on three different pages of the home screen. When the user exits the application, it may be difficult to find where the new applications are displayed on the home screen. Therefore, it would be beneficial to signal to the user where the new applications were located upon exiting the application store.

At step 610, the device generates an application menu UI with one or more pages containing one or more graphical objects corresponding to applications installed on the device. In one embodiment, multiple pages may be generated, even though in some embodiments only one page may be shown at a time. The graphics module 134, graphical object module 136, page generator module 138 may generate the application menu user interface. To generate the one or more pages containing one or more graphical objects corresponding to applications installed on the device, the page generator module 138 may be responsible for determining where to place the icons for recently installed applications.

At step 612, a page with a recently installed application is displayed on the screen of the device. An example of step 612 is FIG. 7D. In one embodiment, the first time an application menu user interface is displayed after a new application has been installed, the application menu user interface "jumps" to a page containing a new app. Whereas, if a new application had not installed, the application menu user interface may have simply displayed a predetermined page of application icons instead of jumping to a page with icons with new applications (e.g., the main home screen page or the last home screen page visited before entering the application store user interface). Therefore, in one embodiment, if an exit instruction is received before step 604, the top-level, application menu user interface may be displayed, and the particular page of application icons may be the main page or the last used page.

Optionally, at step 614, a visual indicator may be displayed with an icon associated with a recently installed application. As described with respect to FIG. 3, the visual indicator could remain displayed until a remove visual indicator event.

FIGS. 7A-D show embodiments of a series of user interfaces that may be displayed while performing a method of the present invention. Second level application store user interface 700 may comprise further information about an application, such as a description of the application, an icon, and other information. The second level application store user interface 700 may also comprise an install button 702. After a user starts the installation of an application, for example, by pressing the install button 702, the same or another application store user interface with applications available for download may be shown. This enables the user to stay in the application store when the download and installation is in progress and the user may download more applications. This is convenient for the user, and beneficial to the content providers. In one embodiment (not shown), it is possible to initiate the download of an application from the first level application store user interface with applications available for download by placing an install button on the first level application store user interface.

Figure 7B:
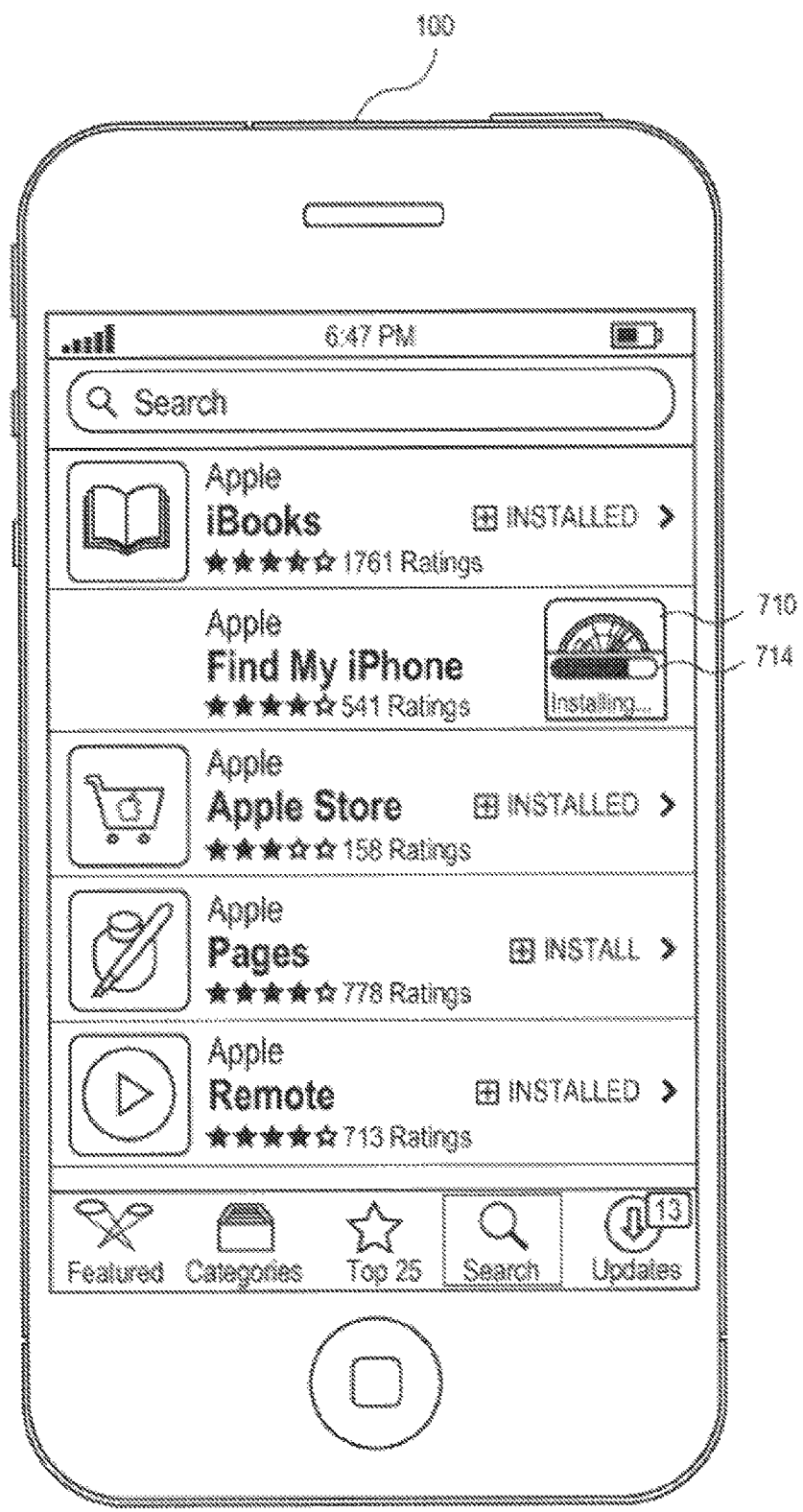

As shown in FIG. 7B, when a download or installing is in progress, the first level application store user interface with applications available for download may have a modified graphical object 710 corresponding to the application being installed or downloaded. In one embodiment, when a download or installing is in progress, the first level application store user interface with applications available for download may have an install progress indicator 714 or a download progress indicator (not shown).

Figure 7C:
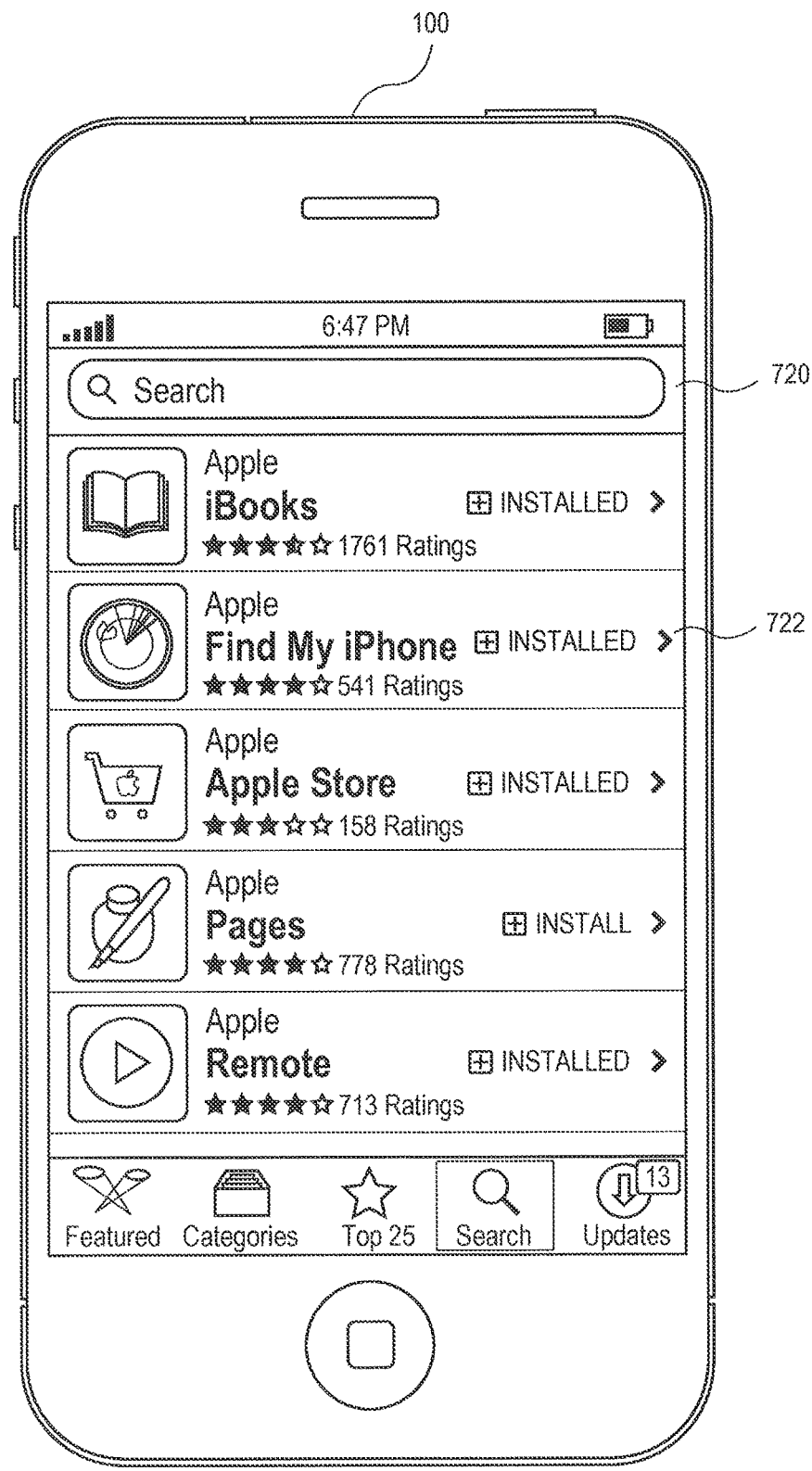

As shown in FIG. 7C, after installation is completed, the first level application store user interface 720 may display an indication that the installation 722 is complete. Again, because embodiments of the present invention allow the user to continue to browse, download, and install additional applications after another application has been selected for download, it may be beneficial to alert the user that the download and installation are completed and ready to use. In one embodiment, the application store user interface may provide an alert to indicate that the application download is complete.

Figure 8A:
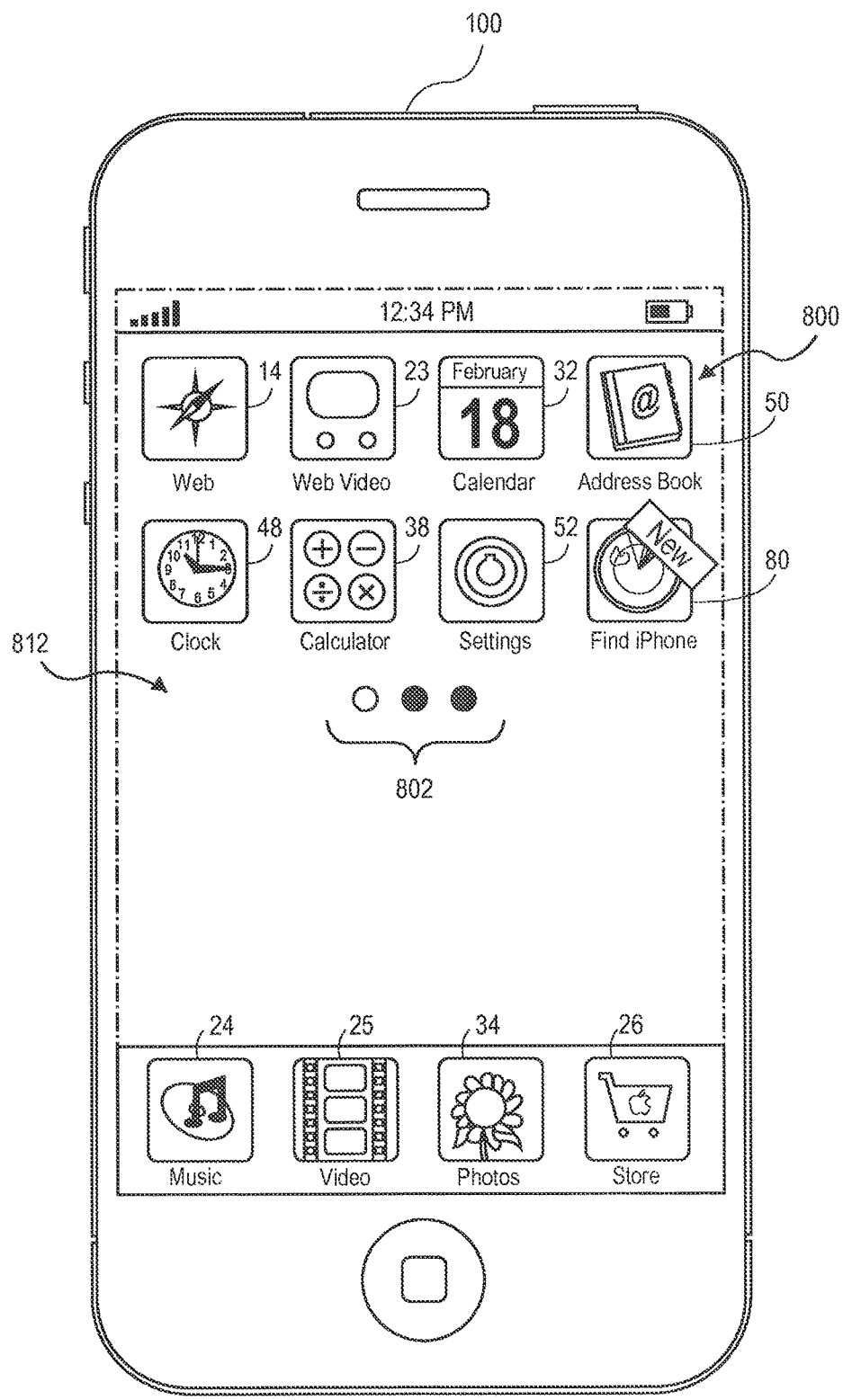
Figure 8B:
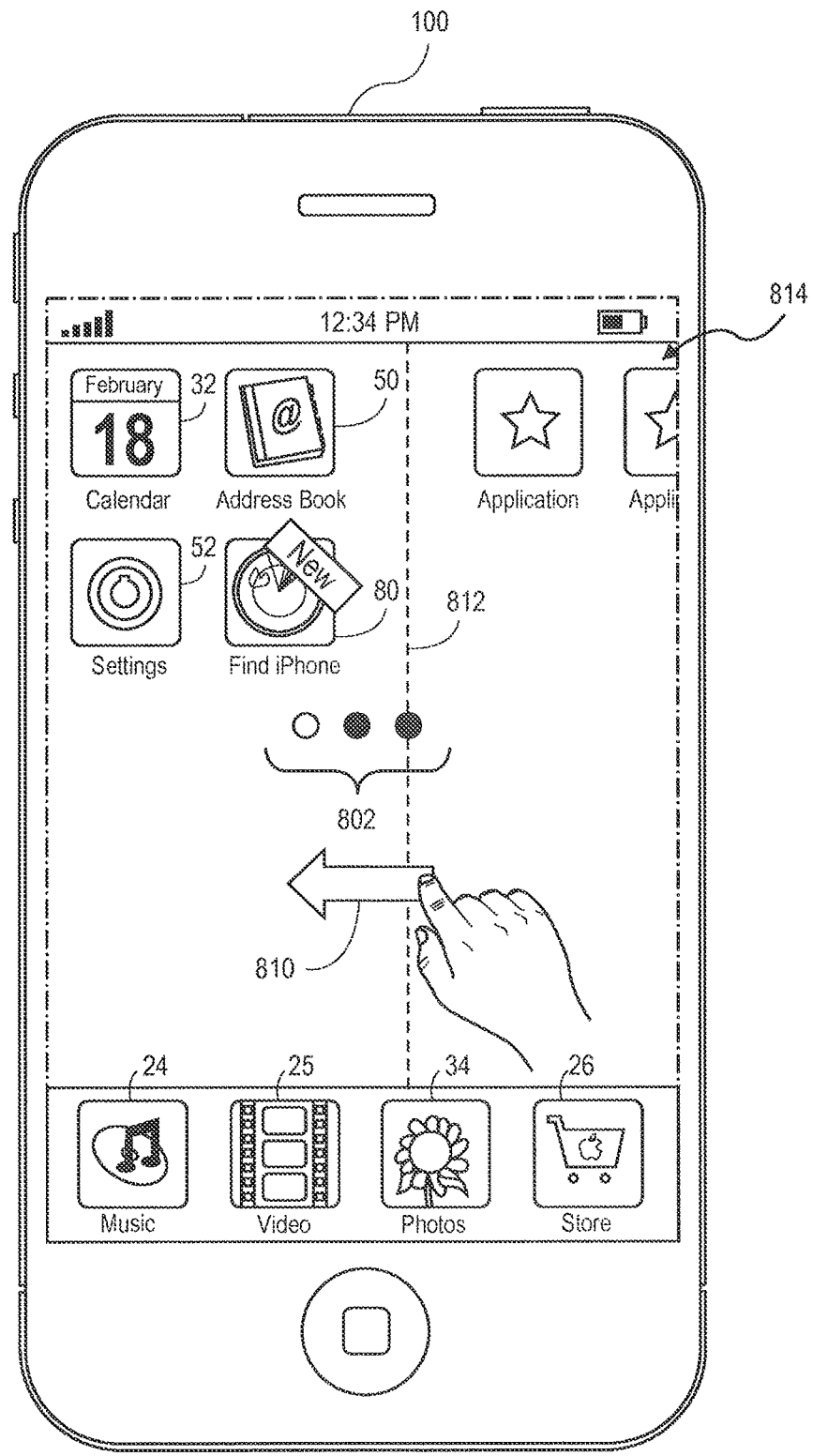
Figure 8C:
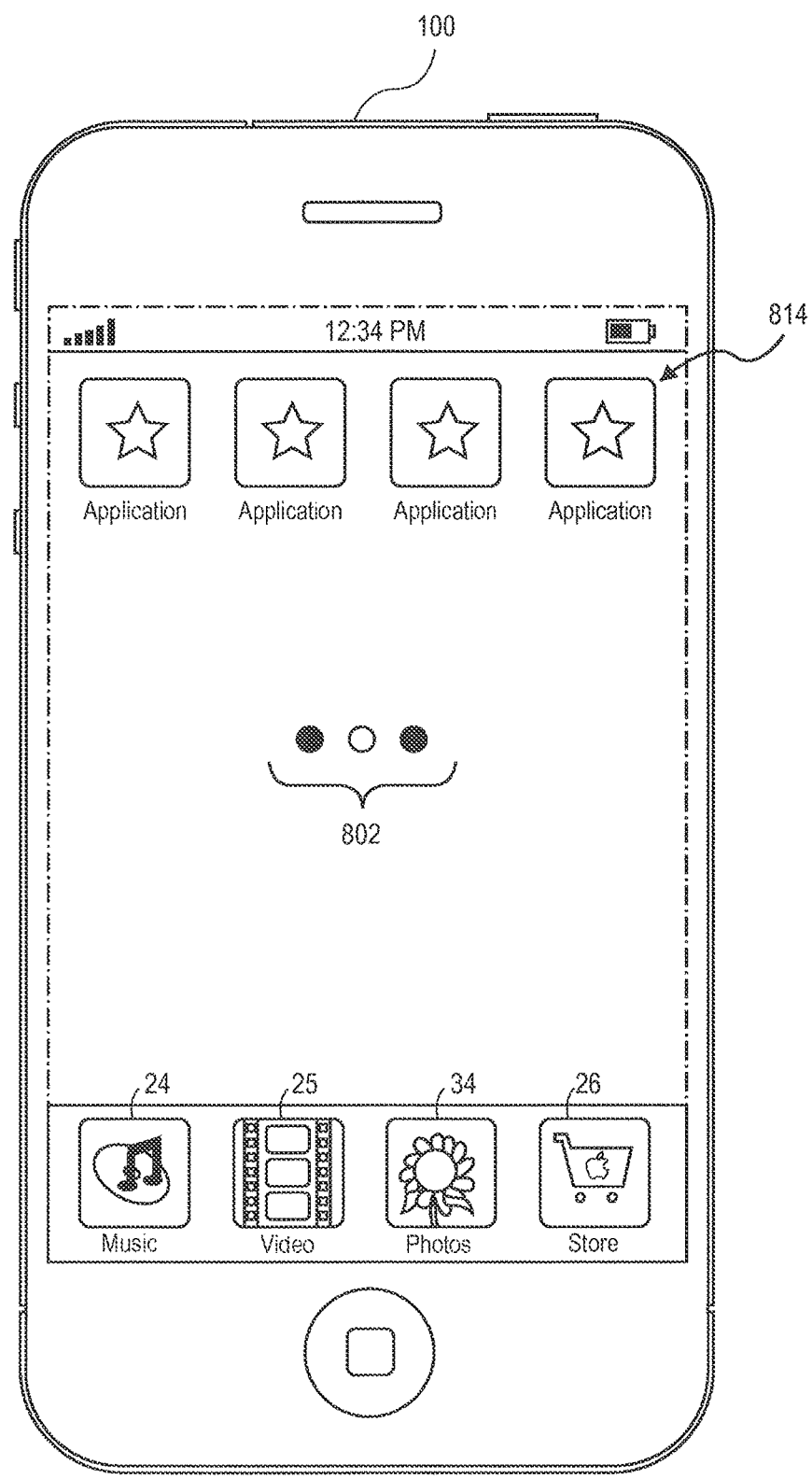

FIGS. 8A-8C show embodiments of an application menu user interface 800. Specifically, in step 610, the graphic module 136 (FIG. 1) may generate an application menu UI with one or more pages containing one or more graphical objects corresponding to applications; FIGS. 8A-8C are examples of the one or more pages generated. FIG. 8A is an example of the display after step 612, and FIGS. 8B-8C show a horizontally scrollable application menu user interface. In other embodiments, a vertically scrolling application menu may be used.

Referring to FIG. 8A, the user interface 800 on the touch-sensitive display contains a set of three page indicator dots 802 within the navigational region 812. The leftmost dot is open or filled with a bright color (e.g., white), while the middle and rightmost dots are filled with a dark color (e.g., black). In some implementations, the leftmost open dot is indicative of a first page within the display. For example, the open dot can refer to the page in which the display objects appear. In some implementations, dragging or swiping in a horizontal manner within the navigational region 812 causes the display to change to the second and/or third pages as indicated by the page indicator dots 802. There can be any number of page indicator dots 802 displayed within the navigational region 812. In some implementations, rather than page indicator dots 802, the navigational region can contain a navigational guide. The navigational guide, for example, can provide the opportunity for both horizontal and vertical navigation within the display.

In some embodiments, the visual appearance of one or more of the page indicators 802 may be modified to indicate that a page has an icon for a recently downloaded application on the page. For example, in FIG. 8A, the left most page indicator may be a "star" shape (not shown) to indicate that the page shown contains an icon for a recently installed application (e.g., Find iPhone icon 80) displayed on user interface 800. Page indicators 802, although shown as dots, may be any suitable size or shape. Examples of changing the visual appearance of the a page indicator include, but are not limited to: modifying the color, opacity, or saturation of the page dot; scaling the size of the page indicator; animating the page indicator (e.g., flashing, blinking, glowing, bouncing, vibrating, etc.); modifying the shape of the page indicator; adding text to the page indicator; or otherwise modifying the visual appearance of the page indicator. In some embodiments, one or more modified page indicator may be used in conjunction with visual indicators for recently downloaded applications.

In certain embodiments, all icons for recently downloaded applications may be placed on a "new application page" of the home screen. The new application page of the home screen may be any of one or more pages, including the first page of the home screen, the last page of the home screen, or an intermediate page of the home screen. A page indicator dot for the new application home screen page may be visually distinguished from the other page indicator dots. For example, if the home screen has three pages before additional applications were installed, icons for new applications installed could be placed on a fourth page of the home screen. In some embodiments, the page indicator dot for the new forth page may be visually distinguishable from other page indicators to indicate that icons for new applications are contained on the fourth page of the home screen. In some embodiments, the icons for the recently downloaded applications may have a visual indicator until a remove visual indicator event occurs.

As shown in FIG. 8B, upon detecting a gesture 810, the display within the mobile device 101 is modified to reflect horizontal movement towards the second page of display objects as referenced by the indicator dots 802. FIG. 8B illustrates an instant in the horizontal movement from the first page to the second page, with reference line 812 marking the boundary between the first page and the second page. The visible portion of the first page includes a portion of the display objects 106 (e.g., the calendar object 32, the address book object 50, the settings object 52, Find My iPhone object 80), and the visible portion of the second page includes a portion of set of display objects 814 (illustrated as generic "Application" objects). An icon for a recently installed application may have a visual indicator, such as a "new" sash as shown with graphical object 80. One of the display objects 814 is only partially visible within the display. In some implementations, partially displayed objects (e.g., display objects in which a percentage of the object is not contained within the region of the visible display) are rendered in a manner which reflects an inactive status. For example, a partially displayed object can be rendered in a transparent, dim, or low resolution image to indicate to the user that the object is not currently selectable.

The page indicator dots indicate that the first page (leftmost open dot) continues to be active. In some implementations, when the gesture 810 is detected, the display scrolls horizontally from one page to another. In some other implementations, the display continues to scroll until a stop indication is detected. For example, the display could continue to scroll until selection of a display object, selection of a button, or other user input is detected. In some implementations, the second page of display objects 814 replaces the first page of display objects 106 without displaying an intermediate position. In some implementations, no visible reference line 812 is displayed between pages. For example, the scrolling pages can be rendered in the manner of a seamless rolling display.

Referring to FIG. 8C, the second page of display objects 814 is visible within the touch-sensitive display of the portable electronic device 100. The middle circle of the page indicator 30 dots 802 is open, reflecting the active page. In some implementations, a swiping or dragging gesture towards the left of the display 102 returns the user to the display illustrated within FIG. 8A. Similarly, a swiping or dragging gesture towards the left of the display, in some implementations, provides the user with access to additional pages of display objects.

Figure 9:
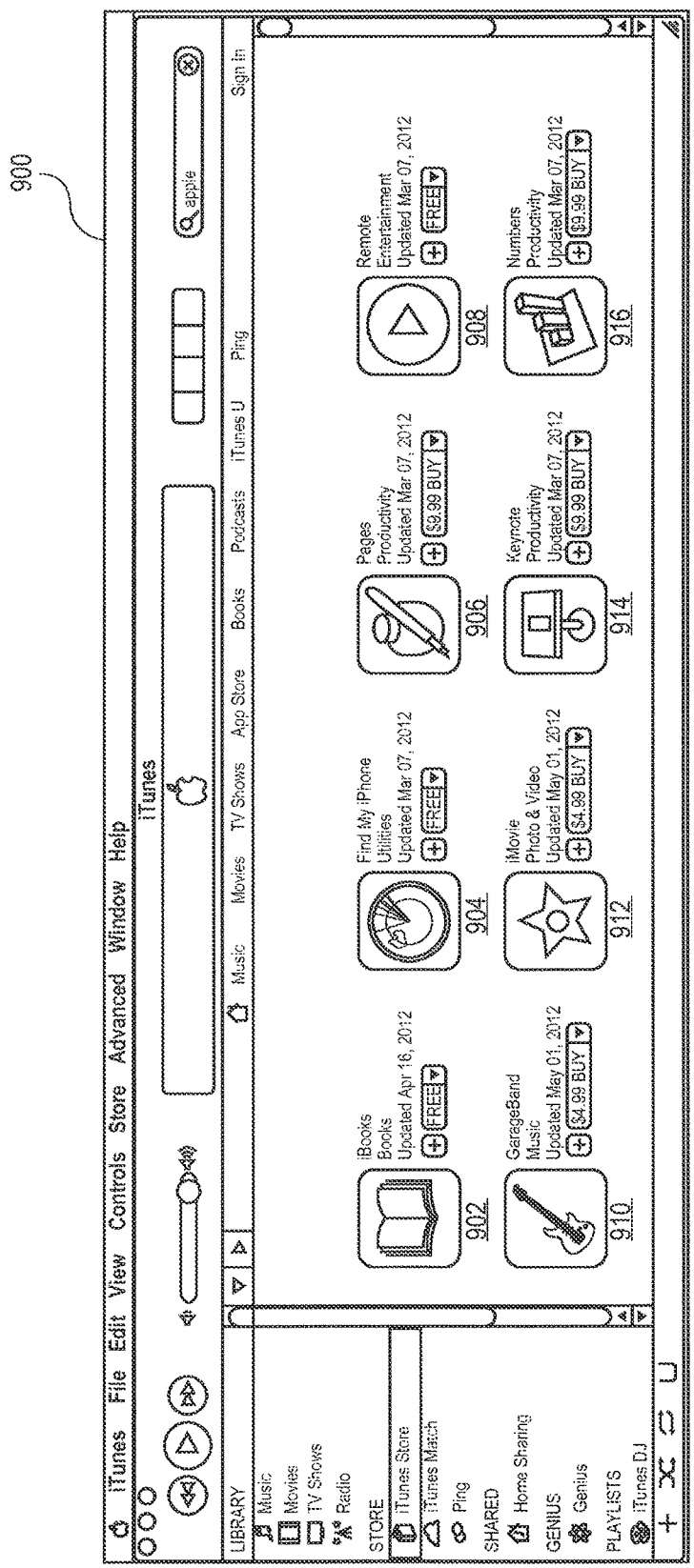
FIG. 9 is an exemplary user interface for initiating an application download from a personal computer according to some embodiments.
Figure 10:
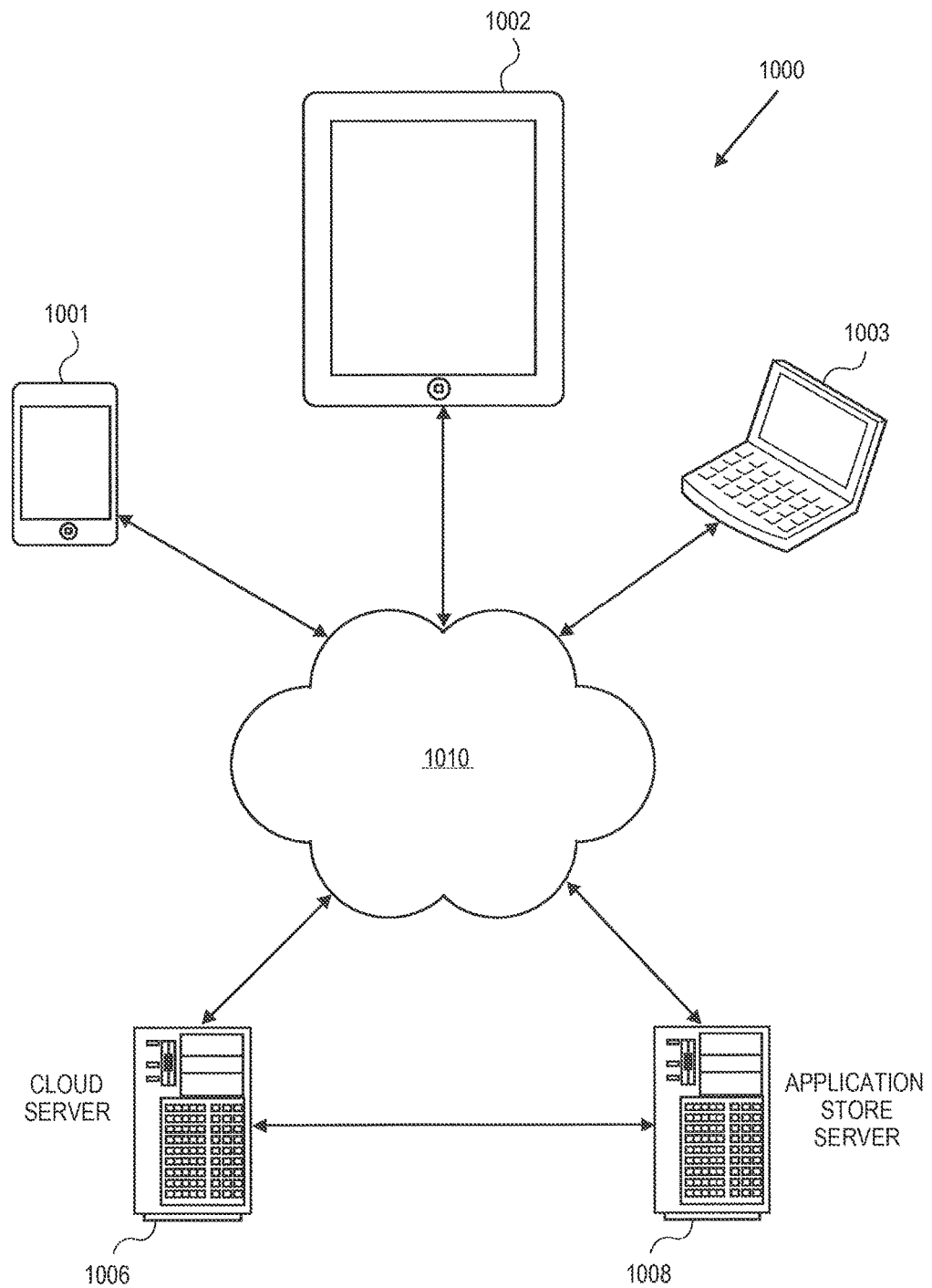
FIG. 10 depicts a simplified diagram of a system according to some embodiments.

Alternative Processes for Installing Applications on Portable Electronic Devices The description above has primarily focused on the installation of applications using an application store application on a portable electronic device to directly download and install the application on the portable electronic device. However, one having skill in the art will recognize that there are other processes for installing applications on portable electronic devices. FIGS. 9 and 10 show possible alternatives for application installation. Alternative application installation processes may be used in accordance with embodiments of the present invention.

In some instances, applications are downloaded from application store servers directly to the portable electronic device, while in other instances the applications are downloaded to a personal computer (PC) and the applications are installed on the portable electronic device during a wired or wireless sync operation.

FIG. 9 shows a user interface 900 for an application store on a personal computer. Graphical objects 902, 904, 906, 908, 910, 912, 914, and 916 are examples of applications for a portable electronic device that are available for download through the application store on the personal computer. In the embodiment illustrated, the iTunes® App Store is used to download applications to a personal computer. After a user has selected applications to download and the download has completed, the applications may be installed on one or more personal electronic devices.

The installation from the personal computer to the portable electronic device may occur in a number of ways. In one embodiment, the portable electronic device is plugged into the computer using an external port 142 (FIG. 1). A sync operation may be performed, and new applications may be installed on the portable electronic device. In another embodiment, the sync operation is performed wirelessly between the portable electronic device and the computer.

FIG. 10 shows one embodiment of a system for practicing embodiments of the present invention. The system 1000 comprises a first portable electronic device 1001, a second portable electronic device 1002, and personal computer 1003. The system 1000 further comprises a cloud server 1006, an application store server 1008, and a network 1010. The cloud server 1006 comprises a server computer for providing a cloud computing environment to a plurality of devices. The application store server 1008 comprises a server computer for provisioning portable electronic device applications to be downloaded. The network 1010 permits wired or wireless communications between each of the components of the system.

Network 1010 may include one or more communication networks, which could be the Internet, a local area network (LAN), a wide area network (WAN), a wireless or wired network, an Intranet, a private network, a public network, a switched network, or any other suitable communication network. Network 1010 may include many interconnected systems and communication links including but not restricted to hardwire links, optical links, satellite or other wireless communications links, wave propagation links, or any other ways for communication of information. Various communication protocols may be used to facilitate communication of information via network 1010, including but not restricted to TCP/IP, HTTP protocols, extensible markup language (XML), wireless application protocol (WAP), protocols under development by industry standard organizations, vendor-specific protocols, customized protocols, and others.

In one embodiment, a first application is installed on the first portable electronic device 1001 using an application store user interface on the portable electronic device. A visual indicator may be associated with an icon for the first application when it is displayed on the portable electronic device 1001. As a result of the installation of the first application on the first portable electronic device 1001, the first application may also be installed wirelessly onto the second portable electronic device 1002. The first portable electronic device 1001 and second portable electronic 1002 device may be associated in some way, for example through a common account. In one embodiment, the account is an iCloud® account set up by a user that owns or controls both the first portable electronic device 1001 and second portable electronic 1002. A visual indicator may be associated with an icon for the first application when it is displayed on the portable electronic device 1002.

In other embodiments, there may be more than two devices. For example, an application download may be initiated at a personal computer 1003, and the application may be wirelessly downloaded and installed onto portable electronic devices (1001 and 1002) associated with the computer 1003. A first visual indicator may be associated with an icon for the application when it is displayed on the first portable electronic device 1001, and a second visual indicator may be associated with an icon for the application when it is displayed on the second portable electronic device 1002.

In one embodiment, when a remove visual indicator event occurs on the first device 1001, the visual indicator is removed on the first device 1001 but remains on the second device 1002 (provided that a remove indicator event has not occurred on the second device 1002). In one embodiment, a remove indicator event on either the first device 1001 or the second device 1002 removes the indicator on both devices.

Various embodiments described above can be realized using any combination of dedicated components and/or programmable processors and/or other programmable devices. The various embodiments may be implemented only in hardware, or only in software, or using combinations thereof. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times. Further, while certain embodiments described above may make reference to specific hardware and software components, those skilled in the art will appreciate that different combinations of hardware and/or software components may also be used and that particular operations described as being implemented in hardware might also be implemented in software or vice versa.

The various embodiments are not restricted to operation within certain specific data processing environments, but are free to operate within a plurality of data processing environments. Additionally, although embodiments have been described using a particular series of transactions, this is not intended to be limiting.

Thus, although the invention has been described with respect to specific embodiments, these are not intended to be limiting. Various modifications and equivalents are within the scope of the following claims.

What is claimed is:

1. A method, comprising:
   at an electronic device with a display and one or more input devices:
   displaying a user interface that includes:
   a folder, and
   a plurality of representations of applications that are installed on the device, wherein the plurality of representations of applications include:
   a representation of a first application that has been recently installed on the device;
   a representation of a second application that has been recently installed on the device; and
   a plurality of representations of applications that have not been recently installed on the device, wherein the representation of the first application and the representation of the second application are visually distinguished from the representations of the applications that have not been recently installed on the device;
   while displaying the plurality of representations of applications, detecting, via the one or more input devices, an interaction with a respective representation of the plurality of representations of applications that are displayed on the display; and
   after detecting the interaction with the respective representation of the plurality of representations of applications that are displayed on the display, displaying the user interface, wherein displaying the user interface includes:
   in accordance with a determination that the interaction with the respective representation includes the occurrence of a remove visual indicator event with respect to the representation of the first application, displaying the user interface includes displaying:
   the representation of the first application that is displayed without a visual indication that the first application has been recently installed on the device; and
   the representation of the second application that is displayed with a visual indication that the second application has been recently installed on the device;
   in accordance with a determination that the interaction with the respective representation includes the occurrence of a remove visual indicator event with respect to the second representation of the second application, displaying the user interface includes displaying:
   the representation of the first application that is displayed with the visual indication that the first application has been recently installed on the device; and
   the representation of the second application that is displayed without the visual indication that the second application has been recently installed on the device; and,
   in accordance with a determination that the interaction with the respective representation includes movement, to the folder, of a respective representation of an application that has been recently installed on the device, displaying the user interface includes:
   displaying the folder with a visual indication that the folder contains the respective representation of the application that has been recently installed on the device, and
   displaying the respective representation of the application with a visual indication that the respective application has been recently installed on the device,
   wherein the respective visual indication that the folder contains the respective representation of the application is distinct from the visual indication that the respective application has been recently installed on the device.

2. The method of claim 1, wherein:
   the visual indication that the first application has been recently installed on the device includes a sash or badge displayed at a location that corresponds to the representation of the first application;
   the visual indication that the second application has been recently installed on the device includes a sash or badge displayed at a location that corresponds to the representation of the second application; and
   the visual indication that the folder contains the respective representation of the application includes a sash or badge displayed at a location that corresponds to the folder.

3. The method of claim 1, wherein:
   the visual indication that the first application has been recently installed on the device includes a change in a graphical appearance of the representation of the first application;
   the visual indication that the second application has been recently installed on the device includes a change in a graphical appearance of the representation of the second application; and
   the visual indication that the folder contains the respective representation of the application includes a change in a graphical appearance of the folder.

4. The method of claim 1, wherein displaying the user interface after detecting the interaction with the respective representation of the plurality of representations of applications that are displayed on the display includes:
   in accordance with a determination that the interaction with the respective representation does not include occurrence of a remove visual indicator event, displaying the user interface includes displaying:
   the representation of the first application with the visual indication that the first application has been recently installed, and
   the representation of the second application with the visual indication that the second application has been recently installed.

5. The method of claim 1, wherein a remove visual indicator event includes opening a respective application that has been recently installed.

6. The method of claim 1, including:
   while the representation of the first application is displayed with the visual indication that the first application has been recently installed on the device, detecting an input that corresponds to a request to move the representation of the first application; and,
   in response to detecting the input that corresponds to the request to move the representation of the first application:

moving the representation of the first application and displaying a visual indication that the first application has been recently installed on the device.

7. An electronic device, comprising:
a display;
one or more input devices;
one or more processors;
memory; and
one or more programs, wherein the one or more programs are stored in the memory and configured to be executed by the one or more processors, the one or more programs including instructions for:
displaying a user interface that includes:
a folder, and
a plurality of representations of applications that are installed on the device, wherein the plurality of representations of applications include:
a representation of a first application that has been recently installed on the device;
a representation of a second application that has been recently installed on the device; and
a plurality of representations of applications that have not been recently installed on the device, wherein the representation of the first application and the representation of the second application are visually distinguished from the representations of the applications that have not been recently installed on the device;
while displaying the plurality of representations of applications, detecting, via the one or more input devices, an interaction with a respective representation of the plurality of representations of applications that are displayed on the display; and
after detecting the interaction with the respective representation of the plurality of representations of applications that are displayed on the display, displaying the user interface, wherein displaying the user interface includes:
in accordance with a determination that the interaction with the respective representation includes the occurrence of a remove visual indicator event with respect to the representation of the first application, displaying the user interface includes displaying:
the representation of the first application that is displayed without a visual indication that the first application has been recently installed on the device; and
the representation of the second application that is displayed with a visual indication that the second application has been recently installed on the device;
in accordance with a determination that the interaction with the respective representation includes the occurrence of a remove visual indicator event with respect to the second representation of the second application, displaying the user interface includes displaying:
the representation of the first application that is displayed with the visual indication that the first application has been recently installed on the device; and
the representation of the second application that is displayed without the visual indication that the second application has been recently installed on the device; and, in accordance with a determination that the interaction with the respective representation includes movement, to the folder, of a respective representation of an application that has been recently installed on the device, displaying the user interface includes:
displaying the folder with a visual indication that the folder contains the respective representation of the application that has been recently installed on the device, and
displaying the respective representation of the application with a visual indication that the respective application has been recently installed on the device,
wherein the respective visual indication that the folder contains the respective representation of the application is distinct from the visual indication that the respective application has been recently installed on the device.

8. The electronic device of claim 7, wherein:
the visual indication that the first application has been recently installed on the device includes a sash or badge displayed at a location that corresponds to the representation of the first application;
the visual indication that the second application has been recently installed on the device includes a sash or badge displayed at a location that corresponds to the representation of the second application; and
the visual indication that the folder contains the respective representation of the application includes a sash or badge displayed at a location that corresponds to the folder.

9. The electronic device of claim 7, wherein:
the visual indication that the first application has been recently installed on the device includes a change in a graphical appearance of the representation of the first application;
the visual indication that the second application has been recently installed on the device includes a change in a graphical appearance of the representation of the second application; and
the visual indication that the folder contains the respective representation of the application includes a change in a graphical appearance of the folder.

10. The electronic device of claim 7, wherein displaying the user interface after detecting the interaction with the respective representation of the plurality of representations of applications that are displayed on the display includes:
in accordance with a determination that the interaction with the respective representation does not include occurrence of a remove visual indicator event, displaying the user interface includes displaying:
the representation of the first application with the visual indication that the first application has been recently installed, and
the representation of the second application with the visual indication that the second application has been recently installed.

11. The electronic device of claim 7, wherein a remove visual indicator event includes opening a respective application that has been recently installed.

12. The electronic device of claim 7, including instructions for:
while the representation of the first application is displayed with the visual indication that the first application has been recently installed on the device, detecting an input that corresponds to a request to move the representation of the first application; and, in response to detecting the input that corresponds to the request to move the representation of the first application:
moving the representation of the first application and displaying a visual indication that the first application has been recently installed on the device.

13. A non-transitory computer readable storage medium storing one or more programs, the one or more programs comprising instructions, which when executed by an electronic device with a display and one or more input devices, cause the electronic device to:
display a user interface that includes:
a folder, and
a plurality of representations of applications that are installed on the device, wherein the plurality of representations of applications include:
a representation of a first application that has been recently installed on the device;
a representation of a second application that has been recently installed on the device; and
a plurality of representations of applications that have not been recently installed on the device, wherein the representation of the first application and the representation of the second application are visually distinguished from the representations of the applications that have not been recently installed on the device;
while displaying the plurality of representations of applications, detect, via the one or more input devices, an interaction with a respective representation of the plurality of representations of applications that are displayed on the display; and
after detecting the interaction with the respective representation of the plurality of representations of applications that are displayed on the display, display the user interface, wherein displaying the user interface includes:
in accordance with a determination that the interaction with the respective representation includes the occurrence of a remove visual indicator event with respect to the representation of the first application, displaying the user interface includes displaying:
the representation of the first application that is displayed without a visual indication that the first application has been recently installed on the device; and
the representation of the second application that is displayed with a visual indication that the second application has been recently installed on the device;
in accordance with a determination that the interaction with the respective representation includes the occurrence of a remove visual indicator event with respect to the second representation of the second application, displaying the user interface includes displaying:
the representation of the first application that is displayed with the visual indication that the first application has been recently installed on the device; and
the representation of the second application that is displayed without the visual indication that the second application has been recently installed on the device; and,
in accordance with a determination that the interaction with the respective representation includes movement, to the folder, of a respective representation of an application that has been recently installed on the device, displaying the user interface includes:
displaying the folder with a visual indication that the folder contains the respective representation of the application that has been recently installed on the device, and
displaying the respective representation of the application with a visual indication that the respective application has been recently installed on the device,
wherein the respective visual indication that the folder contains the respective representation of the application is distinct from the visual indication that the respective application has been recently installed on the device.

14. The non-transitory computer readable storage medium of claim 13, wherein:
the visual indication that the first application has been recently installed on the device includes a sash or badge displayed at a location that corresponds to the representation of the first application;
the visual indication that the second application has been recently installed on the device includes a sash or badge displayed at a location that corresponds to the representation of the second application; and
the visual indication that the folder contains the respective representation of the application includes a sash or badge displayed at a location that corresponds to the folder.

15. The non-transitory computer readable storage medium of claim 13, wherein:
the visual indication that the first application has been recently installed on the device includes a change in a graphical appearance of the representation of the first application;
the visual indication that the second application has been recently installed on the device includes a change in a graphical appearance of the representation of the second application; and
the visual indication that the folder contains the respective representation of the application includes a change in a graphical appearance of the folder.

16. The non-transitory computer readable storage medium of claim 13, wherein displaying the user interface after detecting the interaction with the respective representation of the plurality of representations of applications that are displayed on the display includes:
in accordance with a determination that the interaction with the respective representation does not include occurrence of a remove visual indicator event, displaying the user interface includes displaying:
the representation of the first application with the visual indication that the first application has been recently installed, and
the representation of the second application with the visual indication that the second application has been recently installed.

17. The non-transitory computer readable storage medium of claim 13, wherein a remove visual indicator event includes opening a respective application that has been recently installed.

18. The non-transitory computer readable storage medium of claim 13, including instructions, which when executed by the electronic device, cause the electronic device to:
while the representation of the first application is displayed with the visual indication that the first application has been recently installed on the device, detect an input that corresponds to a request to move the representation of the first application; and,
in response to detecting the input that corresponds to the request to move the representation of the first application:
move the representation of the first application and
display a visual indication that the first application has been recently installed on the device.

* * * * *